US012626255B1

(12) United States Patent
Jablonski et al.

(10) Patent No.: US 12,626,255 B1
(45) Date of Patent: May 12, 2026

(54) FACE GROUPING FOR FRAUD REDUCTION

(71) Applicant: Block, Inc., San Francisco, CA (US)

(72) Inventors: Mitchell Jablonski, Cherry Hill, NJ
(US); Cole Clifford, Stirling (CA);
Hyunjin Choi, New York, NY (US);
Kyle DeFreitas, Etobicoke (CA);
David Puldon, South San Francisco,
CA (US); Ryan Fechte, Saint Louis,
MO (US); Danielle Fiudo, Fairmont
City, IL (US); Sachin Rana, Brampton
(CA); Aditya Joshi, Brooklyn, NY
(US); Erin Gluck, Saint Louis, MO
(US)

(73) Assignee: Block, Inc., Oakland, CA (US)

( * ) Notice: Subject to any disclaimer, the term of this
patent is extended or adjusted under 35
U.S.C. 154(b) by 22 days.

(21) Appl. No.: 17/983,013

(22) Filed: Nov. 8, 2022

(51) Int. Cl.
*G06Q 20/40* (2012.01)
(52) U.S. Cl.
CPC ... *G06Q 20/4016* (2013.01); *G06Q 20/40145*
(2013.01)
(58) Field of Classification Search
CPC ..................... G06Q 20/4016; G06Q 20/40145
See application file for complete search history.

(56) References Cited

U.S. PATENT DOCUMENTS

2019/0341058 A1* 11/2019 Zhang .................... G06N 3/045
2020/0143079 A1* 5/2020 Sohn ................... G06F 21/6245
2021/0089899 A1* 3/2021 Bercich ................. G06N 3/084
2021/0398135 A1* 12/2021 Huber, Jr. ............. G06N 20/00

OTHER PUBLICATIONS

Low-Resolution Face Recognition in the Wild via Selective Knowl-
edge Distillation (Year: 2019).*
Lightweight and Resource-Constrained Learning Network for Face
Recognition with Performance Optimization (Year: 2020).*
Lightweight Low-Resolution Face Recognition for Surveillance
Applications (Year: 2021).*
Multi-scale patch based representation feature learning for low-
resolution face recognition (Year: 2020).*
Generative models and their latent space (Year: 2023).*
VGAN based Image Representation Learning (Year: 2018).*
Auto Encoder Based Image Inpainting Model Using Multi Layer
Latent Representations (Year: 2021).*

(Continued)

*Primary Examiner* — Arunava Chakravarti
(74) *Attorney, Agent, or Firm* — IP Spring

(57) ABSTRACT

Using face grouping for fraud reduction is described. A
server(s) may receive, in association with a request to access
the service, image data representing a face of a user and
additional data, determine, based at least in part on the image
data and using a trained machine learning model(s), a
representation of the face, and determine one or more
representations of faces associated with the representation.
The server(s) can further determine first information based
at least in part on the additional data, determine second
information associated with the one or more representations,
determine one or more differences between the first infor-
mation and the second information, and determine whether
to accept or deny the request based at least in part on the
determining of the one or more differences.

15 Claims, 11 Drawing Sheets

(56) References Cited

OTHER PUBLICATIONS

Dimensionality Reduction by Learning an Invariant Mapping (Year: 2006).*

From Local Geometry to Global Structure (Year: 2015).*

Laplacian Eigenmaps (Year: 2003).*

Learning privacy-enhancing face representations through feature disentanglement (Year: 2021).*

Privacy Enhancing Biometric (Year: 2021).*

\* cited by examiner

100

DATA
116

USER ACCOUNTS
118

USER DATA
120

DEVICE DATA
122

AI-GENERATED FACE REPRESENTATIONS
124

114

110

SERVICE
108

MACHINE LEARNING MODEL(S)
136

IDENTITY VERIFICATION (IDV) COMPONENT
138

USER ONBOARDING COMPONENT
140

112

NETWORK(S)

FACE IMAGE DATA

132

ADD'L DATA

134

104

APP
106

USER

102

126(1)

Create User Account

FACE IMAGE
128

Submit

130

126(2)

Request Denied

More info.

142

400

RECEIVE, IN ASSOCIATION WITH A REQUEST TO ACCESS A SERVICE, IMAGE DATA
REPRESENTING A FACE OF A USER AND ADDITIONAL DATA
402

DETERMINE A REPRESENTATION OF THE FACE BASED ON THE IMAGE DATA AND USING A
MACHINE LEARNING (ML) MODEL(S)
404

SEARCH FOR REPRESENTATIONS OF FACES SIMILAR TO THE REPRESENTATION
406

SIMILAR
FACE REPRESENTATION(S)
FOUND?
408

YES

NO

DETERMINE FIRST INFORMATION
BASED ON THE ADDITIONAL DATA
416

USER IDENTITY
VERIFIED?
410

NO

DETERMINE SECOND INFORMATION
ASSOCIATED WITH THE SIMILAR
FACE REPRESENTATION(S)
418

YES

ACCEPT THE
REQUEST
412

DENY OR INTERRUPT
THE REQUEST, OR
ACCEPT THE
REQUEST WITH
RESTRICTED ACCESS
414

DIFFERENCE(S)
BETWEEN FIRST INFO.
AND SECOND INFO.?
420

YES

NO

NOTIFY USER OF EXISTING
USER ACCOUNT AND/OR
REQUEST LOGIN
CREDENTIALS
422

FIG. 4

500

DETERMINE A REPRESENTATION OF A FACE OF A USER BASED ON FACE IMAGE DATA
AND USING A MACHINE LEARNING (ML) MODEL(S)
502

PERFORM, BASED ON THE REPRESENTATION, AN APPROXIMATE NEAREST NEIGHBOR
SEARCH OF FACE REPRESENTATIONS STORED IN A DATA STORE(S)
504

DETERMINE A SUPERSET OF FACE REPRESENTATIONS BASED ON THE APPROXIMATE
NEAREST NEIGHBOR SEARCH
506

CALCULATE DISTANCES BETWEEN THE REPRESENTATION AND THE SUPERSET OF FACE
REPRESENTATIONS
508

COMPARE THE DISTANCES TO A THRESHOLD DISTANCE
510

DETERMINE, FROM THE SUPERSET, A SUBSET OF FACE REPRESENTATIONS ASSOCIATED
WITH DISTANCES THAT FAIL TO SATISFY THE THRESHOLD DISTANCE AND DESIGNATING
THE SUBSET OF FACE REPRESENTATIONS AS SIMILAR TO THE REPRESENTATION
512

FIG. 5

600

GENERATE A TRAINED MACHINE LEARNING (ML) MODEL(S) UTILIZING FACE IMAGE DATA AS A TRAINING DATASET, THE TRAINED ML MODEL(S) BEING TRAINED TO GENERATE N-DIMENSIONAL REPRESENTATIONS OF FACES
602

USE THE TRAINED/RETRAINED ML MODEL(S) AND RETRAIN PERIODICALLY
604

DETERMINE AN ACCURACY METRIC(S) ASSOCIATED WITH THE TRAINED ML MODEL(S)
606

DOES ACCURACY METRIC SATISFY AN UPPER THRESHOLD?
608

No

YES

DOES ACCURACY METRIC FAIL TO SATISFY A LOWER THRESHOLD?
612

No

YES

RETRAIN THE TRAINED ML MODEL(S) UTILIZING FACE IMAGE DATA AS A TRAINING DATASET TO GENERATE A RETRAINED ML MODEL(S) THAT IS TRAINED TO GENERATE P-DIMENSIONAL EMBEDDINGS OF FACES, P BEING LESS THAN N
610

RETRAIN THE TRAINED ML MODEL(S) UTILIZING FACE IMAGE DATA AS A TRAINING DATASET TO GENERATE A RETRAINED ML MODEL(S) THAT IS TRAINED TO GENERATE Q-DIMENSIONAL EMBEDDINGS OF FACES, Q BEING GREATER THAN N
614

FIG. 6

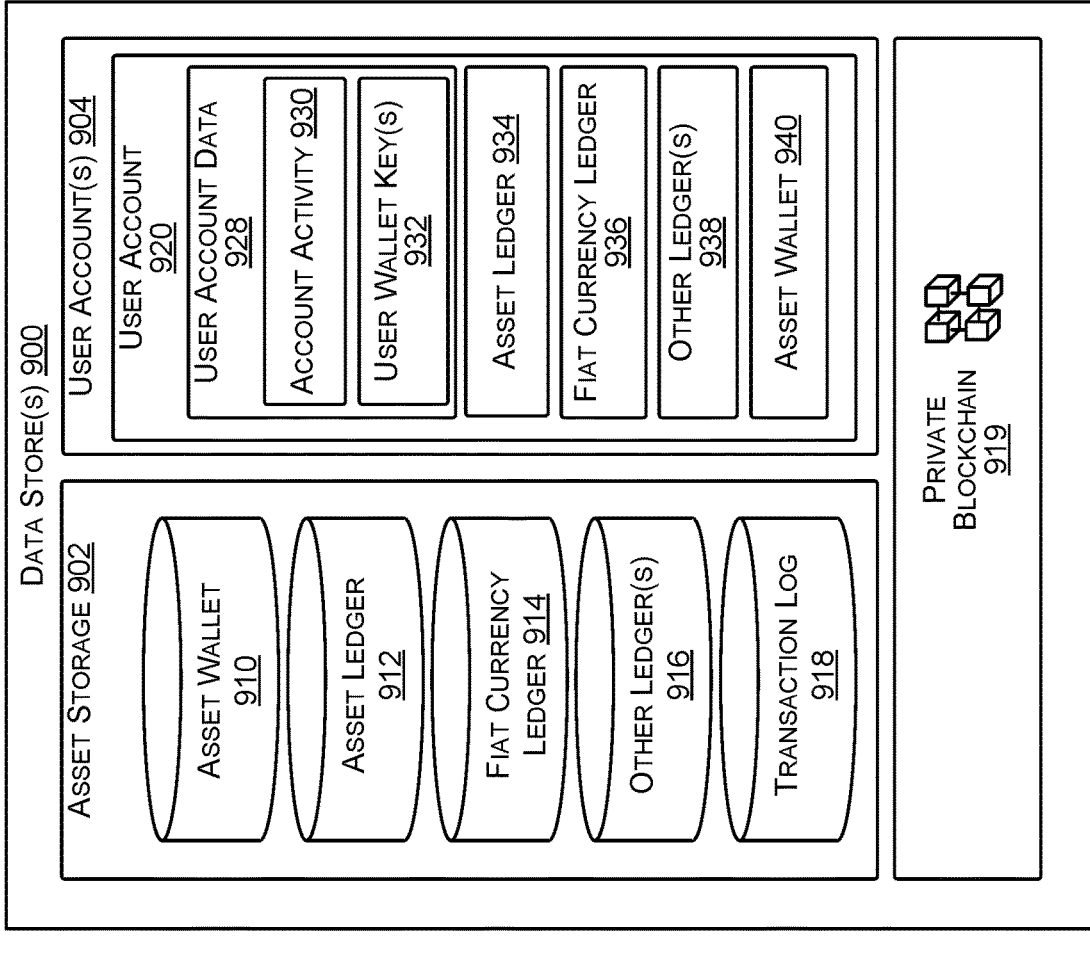
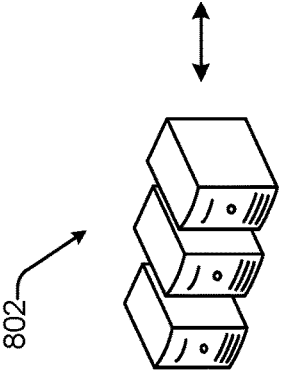
FIG. 9

FACE GROUPING FOR FRAUD REDUCTION

TECHNICAL FIELD

Applications, which are downloadable and executable on user devices, enable users to interact with other users. Such applications are provided by service providers and utilize one or more network connections to transmit data among and between user devices to facilitate such interactions. Many applications have access to or are integrated with cameras or other sensor devices that enable image capture or the like.

BRIEF DESCRIPTION OF THE DRAWINGS

Features of the present disclosure, its nature and various advantages, will be more apparent upon consideration of the following detailed description, taken in conjunction with the accompanying drawings.

FIG. 4 is an example process for using face grouping for fraud reduction, according to an implementation of the present subject matter.

FIG. 5 is an example process for grouping a face representation of a requesting user with similar face representations, according to an implementation of the present subject matter.

FIG. 6 is an example process for retraining a machine learning model(s) to reduce computing resource consumption and/or to reduce latency without compromising face grouping accuracy, according to an implementation of the present subject matter.

FIG. 9 is an example data store used for performing techniques described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
FIG. 1 is an example environment for using face grouping for fraud reduction, according to an implementation of the present subject matter.

Described herein are, among other things, techniques, devices, and systems for using face grouping for fraud reduction. In an example, a computing platform may be used to implement a service, such as a payment service. Data may be received by the computing platform (hereinafter, "service computing platform") in association with a request to access the service. For example, during an onboarding process, as part of an identity verification (IDV) procedure for creating a new user account with the service, a user may capture an image, video, or other content representative of their face (e.g., the user may take a selfie, may have another user capture an image, video, etc. of the user, etc.) using a camera of an electronic device, and the corresponding image data may be received by the service computing platform in association with a request to create the new user account. In some examples, the data received by the service computing platform in association with the request may include additional data, such as additional image data representing another form of identification, such as a driver license, a school identification (id) card, a membership card, etc. (e.g., an image of the front of the driver license, id card, membership card, etc. and/or an image of the back of the driver license, id card, membership card, etc.). The driver license, for example, may include another face image, a name, a date of birth (DOB), an address, a machine-readable code (e.g., a barcode), and/or other information, data, symbols, indicia, or the like. Even without receiving any additional or alternative data, the service computing platform can use face grouping to verify the identity of the user (e.g., by determining, based at least in part on the image of the face of the user, that the user is who he/she says he/she is).

In an example, the disclosed face grouping techniques may be used to determine whether the service computing platform has "seen" the requesting user's face in the past (e.g., whether the service computing platform has previously received face images that are similar to the requesting user's face), and, if so, this may be indicative of a repeat attempt to access the service. In some cases, detecting that the requesting user's face has been "seen" by the service computing platform in the past may be indicative of the user attempting to engage in fraudulent (or non-compliant) behavior (e.g., by creating an illegitimate user account) while using the service. For instance, the service computing platform can determine first information (e.g., a name, a DOB, etc.) based at least in part on the additional data (e.g., the additional image data representing the driver license) received in association with the request to access the service, and second information (e.g., names, DOBs, etc.) associated with previously-received images of faces that are similar to the face of the requesting user, and, if there is a difference(s) (e.g., a discrepancy(ies)) between the first information and the second information, and/or if the information differences satisfy a threshold, the user's request may be classified as fraudulent and denied or otherwise interrupted accordingly. In this manner, the techniques, devices, and systems described herein mitigate or reduce fraudulent use of the service by making it difficult for fraudsters to create illegitimate user accounts with, or otherwise access, the service.

Due to data breaches, stolen personally identifying information (PII) can be obtained with relative ease on the dark net. Although the vast majority of users of services do not engage in fraudulent behavior, there is often a population of users who may try to exploit conventional IDV processes using stolen PII in combination with repurposed face images (e.g., selfies, or images, videos, etc. of the user captured by another user, etc.), and, if successful, these fraudsters are able to create illegitimate user accounts with a service, with no intention of becoming legitimate users of the service. Oftentimes this exploitation occurs at a time of onboarding a new user, when the service computing platform associated with the service has little-to-no information about the new user. Because of this, and because the onboarding process is carried out electronically via the Internet and/or one or more networked devices (i.e., not in-person), it is difficult for a service provider to definitively determine whether the new user is a legitimate user who intends to use the service legitimately, or whether the new user is a "fraudster" looking to gain access to the service (e.g., a banking service, a brokerage service, a financial service, and/or a payment service) and potentially engage in fraudulent behavior while using the service.

The techniques, devices, and systems described herein train a machine learning model(s) to generate representations of faces. For example, image data representing faces can be collected by the service computing platform as new users are onboarded to the service. Over time, one can appreciate that a large collection of historical face image data tied to registered user accounts may be available to the service computing platform. Additionally. or alternatively, face image data can be obtained from other sources. The service computing platform can then train one or more machine learning models based on a portion of the face image data as a training dataset, whereby the machine learning model(s) can learn to generate a representation of a face. As described above, in an example, the service computing platform may receive, in association with a request to access the service, image data representing a face of a user. For example, the image data may represent an image, video, or other content representative of the face of the user captured via a camera of an electronic device while the electronic device is executing an application associated with the service. The trained machine learning model(s) can be used to determine a representation of the face of the user based at least in part on the image data. This face representation (sometimes referred herein as an "artificial intelligence (AI)-generated face representation," a "vector representation," or a "latent space representation") may be a numerical representation, such as an embedding, that represents a face (e.g., the face of the requesting user).

To implement the disclosed face grouping techniques, the service computing platform may determine one or more AI-generated representations of faces associated with (e.g., similar to) the AI-generated representation of the face of the requesting user. That is, the service computing platform is configured to group the AI-generated representation of the requesting user's face with other AI-generated face representations, which may be stored in a data store accessible to the service computing platform. This face grouping technique can be used to determine if the service computing platform has "seen" the requesting user's face at a time(s) in the past. The mere existence, in the data store, of another AI-generated representation of a face that looks similar to the user's face may be indicative of an attempt to create a duplicative user account. In some instances, a legitimate user may have forgotten that he/she already created an existing user account. In such a scenario, there may be a valid reason to deny the user's request, or at least interrupt the request to notify the legitimate user of the existing user account so that the user does not inadvertently create another user account. In some examples, a legitimate user may intend to create an additional user account despite having already created an existing user account, and the service may provide the user with such an option after verifying the identity of the user through additional IDV checks. In some cases, however, the existence, in the data store, of another AI-generated representation of a face that looks similar to the user's face may be indicative of a fraudulent attempt to access the service (e.g., to create an illegitimate user account). Accordingly, the service computing platform may be configured to compare first information associated with the requesting user (e.g., information extracted from image data representing another form of identification (e.g., the driver license) provided by the requesting user in association with the request to access the service, device data associated with the electronic device of the requesting user, etc.) with second information associated with the AI-generated representation(s) of a similar face(s) identified in the data store. If the service computing platform determines that differences between the first information and the second information satisfy a threshold (e.g., by performing one or more IDV checks with respect to the user), the user's request may be denied. or otherwise interrupted, in order to prevent, or deter, the user from creating an illegitimate user account, thereby mitigating or reducing the above-described fraudulent use of the service by a suspected fraudster.

In an illustrative example, a user may have created a first user account with the service by completing an onboarding process where the user submitted a first image of their face, potentially along with an image of another form of identification (e.g., a driver license) that includes another face image, a name, a DOB, and/or other information. Subsequently, the same user attempts to create an illegitimate user account (e.g., using stolen PII obtained from the dark net). For example, the user may create a fake driver license with the stolen PII (e.g., a stolen name, DOB, etc.) and with a photograph of the user's face on the fake driver license. The user then captures, or has another user capture, an image(s), video(s), or other content representative of their face, as well as an image(s), video(s), etc. of the fake driver license, using an electronic device (e.g., a mobile phone) that is executing an application associated with the service. Corresponding image data is received by the service computing platform as an IDV attempt to create an illegitimate user account with the service. The service computing platform, may use the trained machine learning model(s) disclosed herein to determine a representation of the face of the requesting user based at least in part on the face image data that was received in association with the user's request. This AI-generated representation of the requesting user's face can be used to search for other AI-generated representations of faces that are associated with (e.g., similar to) the AI-generated representation of the user's face, as described in further detail below. If a similar AI-generated representation(s) is/are found, the service computing platform may compare first information (e.g., a name(s), a DOB, etc.) determined from the additional data (e.g., image data representing the fake driver license) that was received in association with the user's request with second information (e.g., a name(s), a DOB(s), etc.) associated with the similar AI-generated face representation(s) found in the search, which may have been submitted in past account-creation requests and/or IDV attempts. If the service computing platform determines that differences between the first information and the second information satisfy a threshold, the user's request to access the service (e.g., the request to create the illegitimate user account) may be denied or otherwise interrupted. In other words, the service computing platform may determine that an AI-generated face representation(s) similar to the user's face already exists in the data store accessible to the service computing platform, and that this similar AI-generated face representation is associated with an existing user account with sufficiently different information (e.g., a different name, a different DOB, etc.), which may indicate that the user's account-creation attempt is a fraudulent attempt to create an illegitimate user account.

The techniques, devices, and systems described herein mitigate or reduce fraudulent use of a service by making it difficult for fraudsters to create illegitimate user accounts with, or otherwise access, the service at a time of onboarding, thereby mitigating or reducing the extent of fraudulent behavior on the service computing platform. For example, fraudsters are currently able to exploit and/or circumvent existing IDV processes by submitting a fake driver license with stolen PII along with a real image of their face. Existing IDV processes that do not analyze the face image for anything other than whether the face image passes a liveness test (e.g., determining that the user actually captured a live image, video, or other content representative of their face, such as by capturing images, videos, etc. of their face from different angles using a camera of an electronic device) are circumventable by fraudsters who are skilled at creating fake driver licenses with stolen identities. The techniques, devices, and systems described herein use machine learning to group the face of the requesting user with faces known to the service computing platform, which makes it more difficult for fraudsters to fake an identity. For instance, even if a fraudster is able to pass a liveness test by capturing a live image of their face, the techniques, devices, and systems described herein are configured to determine whether the requesting user has already created a user account and is subsequently attempting to create an illegitimate user account, or otherwise access the service fraudulently. This makes it difficult for fraudsters to gain access to the service (e.g., by creating illegitimate user accounts).

The techniques, devices, and systems described herein allow for, among other things, one or more devices to conserve resources with respect to processing resources, memory resources, networking resources, power resources, etc., in the various ways described herein. For example, as discussed above, a trained machine learning model(s) may be trained to generate a representation of a face, which is then used in the face grouping techniques described herein to mitigate or reduce fraud. In some examples, this trained machine learning model(s) can be retrained (e.g., iteratively) in order to reduce computing resource consumption and/or to reduce latency without compromising face grouping accuracy. For instance, when higher-dimensional AI-generated face representations are used to implement the disclosed face grouping techniques, the service computing platform may be better-equipped to group similar AI-generated face representations together at a lower false positive rate, meaning that the service computing platform may be better at determining whether it has "seen" the requesting user's face at a time(s) in the past. The trade-offs with using higher-dimensional AI-generated face representations, however, are that more computing resources may be required to process and store the higher-dimensional AI-generated face representations, and/or that latency may increase because it may take longer to group higher-dimensional AI-generated face representations together. By contrast, lower-dimensional AI-generated face representations may allow for conserving computing resources because fewer computing resources (e.g., processing resources, memory resources, etc.) are utilized to process and store the lower-dimensional AI-generated face representations, and, in turn, latency may decrease because lower-dimensional AI-generated face representations can be grouped together faster, as compared to grouping higher-dimensional AI-generated face representations. Yet, a trade-off of using lower-dimensional AI-generated face representations is a potential for grouping similar AI-generated face representations together at a higher false positive rate (e.g., due to an increase in instances of similar AI-generated face representations actually representing different users who happen to look alike). In order to conserve computing resources without compromising the accuracy of the disclosed face grouping techniques, an accuracy metric (s) associated with the trained machine learning model(s) that is currently being used to generate the face representations can be evaluated, and, if the accuracy metric(s) satisfies a threshold (indicating that the trained machine learning model(s) may be overperforming in terms of its face grouping accuracy), the trained machine learning model(s) can be retrained to generate lower-dimensional face representations in order implement the disclosed face grouping techniques with reduced computing resource consumption and/or reduced latency.

The techniques, devices, and systems described herein improve security in the context of IDV procedures by allowing for the retirement of highly-sensitive PII for IDV procedures. For example, conventional IDV processes, in order to verify the identities of users with high confidence, often require users to submit certain types of highly-sensitive PII, such as a social security number (SSN). Transmitting data representing such highly-sensitive PII over a network and/or storing the data in a network-accessible storage location inherently increases the risk of the PII being stolen through data breaches, data leaks, or otherwise. The face grouping techniques disclosed herein can be used as a standalone IDV solution such that the use of highly-sensitive PII (e.g., SSNs) can be eliminated from IDV procedures altogether. Thus, highly-sensitive PII, such as SSNs, no longer need to be transmitted and stored for purposes of verifying user identities, which reduces the risk of such highly-sensitive PII being stolen, thereby improving the security of an IDV process.

The techniques, devices, and systems described herein enable dynamic decisions based on minimal data at onboarding. For example, in conventional techniques, service providers, such as payment service providers, often are unable to determine whether a user is legitimate with minimal user data available at the time of onboarding. Therefore, service providers become vulnerable to fraudsters, as described herein. The techniques, devices, and systems described herein may identify fraudulent attempts to access a service, even when the requesting user provides minimal data (e.g., an image of the user's face and an image of a driver license) at a time of onboarding. Moreover, by mitigating fraudulent behavior on the service computing platform, fewer illegitimate user accounts are created, and the resulting user experience of legitimate users on the service computing platform is improved by fostering an ecosystem of predominantly legitimate users (and fewer illegitimate users). This enhances trust in and security of the service computing platform. Further, mitigating fraud on a payment service computing platform may, in turn, curb misdirected payments or mitigate instances of legitimate users inadvertently transferring funds to unintended recipients who have fraudulently created illegitimate user accounts with the payment service. In other words, legitimate users of the payment service can trust that most of the other registered users are also legitimate users of the payment service. This inherently reduces the number of illegitimate transactions and chargeback requests, thereby reducing the use of network resources and consumption thereof. As such, techniques, devices, and systems provide improvements to computing devices.

Furthermore, the techniques, devices, and systems described herein use AI-generated representations of faces (e.g., numerical representations, such as embeddings) for face grouping, rather than the images themselves, which protects the privacy of users. For example, even though the service computing platform may receive and store image data representing images of users' faces, after this image data is processed with the use of a trained machine learning model(s) to generate AI-generated face representations, the original image data can be encrypted and stored without having to access the image data again, or at least accessing the image data infrequently. In other words, encrypted image data pertaining to users' faces can remain protected to preserve user privacy, while AI-generated representations (e.g., numerical representations) of faces are used for implementing the face grouping techniques described herein. In some examples, the original face image data and/or the encrypted face image data can be discarded (e.g., deleted from the data store) to further enhance user privacy.

While several examples presented herein are directed to reducing fraud in the context of a payment service, the techniques described herein are also applicable to other types of services that allow users to register with the service by creating user accounts, and which may have an IDV process where the identities of users are verified prior to granting users access to the service. Examples of other types of services besides payment services include electronic commerce (ecommerce) services, social networking services, gaming services, merchant services, loyalty program services, loan services (e.g., capital loan, buy now pay later loan, etc.), music, podcast and/or video streaming services, or the like. Further, as described above, techniques described herein can be applicable to any type of request for accessing a service, whether the request involves creating a user account or not. For example, in some instances, techniques, devices, and systems described herein can be used for granting users access to particular features or functionalities of a service.

While techniques described herein refer to the use of "faces" the same or similar techniques can be applicable to other characteristics of users. In some examples, the same or similar grouping techniques can be used for portions of faces (e.g., eyes, noses, mouths, etc.), full bodies, and/or body parts. In such examples, the models described herein can be trained on different input data and can output different representations, but the techniques, devices, and systems can be otherwise applicable to more or less than a face.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 is an example environment 100 for using face grouping for fraud reduction, according to an implementation of the present subject matter. As depicted, the example environment 100 may include users, such as the user 102. Users may be associated with respective electronic devices, such as the electronic device 104. The electronic device 104 is configured to execute an application 106 (interchangeably referred to as "app" 106). The application 106, when executing on the electronic device 104, may allow the user 102 to navigate to the various user interfaces described herein, to interact with, or access, a service 108. In some examples, the application 106 represents a payment application and the service 108 represents a payment service. In some examples, users, such as the users 102, can interact with the user interfaces, for example, to facilitate transactions (e.g., electronic payments), such as transactions with other users, among other things. In some examples, the application 106 allows two users who are "peers" to transfer funds in a "peer-to-peer (P2P)" transaction. In at least one example, the application 106 allows for the efficient transfer of funds (e.g., fiat currency, securities (e.g., stocks, bonds, mutual funds), cryptocurrencies, gift cards, etc.) between users of the service 108. Such transfers can be "efficient" in that they can happen electronically, in real-time or near real-time, due to a complex integration of software and hardware components configured to facilitate such transfers. In some examples, the application 106 allows a merchant and a customer of the merchant to transfer funds between each other, such as when the customer is purchasing an item(s) from the merchant. In some examples, different instances of the application 106 can be provided by a computing platform 110 that is used to implement the service 108 (hereinafter, "service computing platform" 110). For example, the user 102 may download and install a particular version of the application 106 on the electronic device 104, either via a first time installation, a software update, or the like.

As depicted by FIG. 1, electronic devices, such as the electronic device 104, may be coupled to the service computing platform 110 via one or more network(s) 112, such as a wide area network (WAN) (e.g., the Internet, a cellular network, etc.). In some examples, the service computing platform 110 may include a cloud-based computing architecture suitable for hosting and servicing instances of the application 106 executing on user electronic devices, such as the electronic device 104. In particular examples, the service computing platform 110 may include a Platform as a Service (PaaS) architecture, a Software as a Service (Saas) architecture, an Infrastructure as a Service (IaaS), a Data as a Service (DaaS), a Compute as a Service (CaaS), or other similar cloud-based computing architecture (e.g., "X" as a Service (XaaS)).

A service provider may operate the service computing platform 110, which may include one or more processing devices, such as one or more servers (or server computing devices), and one or more data stores 114. The one or more servers of the service computing platform 110 may be configured to provide processing or computing support for instances of the application 106 executing on electronic devices, such as the electronic device 104. The data stores 114 may include, for example, one or more internal data stores that may be utilized to store data 116, such as data representing user accounts 118 of registered users, user data 120 (e.g., PII, image data of users (e.g., face images), user transaction history data, user purchase history data, user attribute data, user credit history data, user asset profile data, user contextual data, user interaction data, user preference data, and so forth) associated with users, such as the user 102, device data 122 (e.g., identifiers of electronic devices, such as the electronic device 104), as well as AI-generated face representations 124.

In particular examples, the one or more data stores 114 may be configured to store one or more data structures designed for recording asset ownership for various users, such as the user 102. As an example and not by way of limitation, the data store(s) 114 may be configured to store one or more ledgers (e.g., internal ledgers, distributed ledgers, etc.) for tracking assets held by the service computing platform 110—each such asset being held by the service computing platform 110 may be owned in whole or in part by the service computing platform 110 itself or in whole or in part by one or more users of the service computing platform 110. The ledger(s) may store service balances associated with the service computing platform 110 representing quantities of assets held by the service computing platform 110. The service balances may include, for example, a fiat currency balance for each of one or more fiat currencies, a securities balance for each of one or more security assets, a cryptocurrency balance for each of one or more cryptocurrencies, other suitable data records, or any combination thereof. The data store(s) 114 may also be configured to store additional ledgers for individual users, such as the user 102. The ledger(s) may be stored as part of a user profile or asset profile for individual users, such as the user 102.

In some examples, the service computing platform 110 may be a hosting and servicing platform for instances of the application 106 executing on electronic devices, such as the electronic device 104. As depicted by FIG. 1, the application 106 may include, for example, user interfaces 126(1)-(2) (collectively 126) for displaying, among other data, interactive elements and/or information associated with the providing the user 102 access to the service 108. In the example of FIG. 1, the user interfaces 126 are displayed in the context of the user 102 requesting to create a user account 118 with the service 108. To illustrate, the user 102 may open the application 106 (e.g., by selecting an icon representing the application 106 on a home screen, from an application menu, etc.), and the user 102 may select an interactive element of the application 106 to create a new user account. In association with this account creation request, the application 106 may prompt the user 102 to capture an image(s), video(s), or other content representative of their face. For example, the application 106 may prompt the user 102 to take a selfie, or to have another user capture an image, video, etc. of the user 102. In some examples, the application 106 may prompt the user 102 to capture multiple images, videos, or other content representative of their face from different angles (e.g., by instructing the user 102 to look left while capturing an image of their face, then instructing the user 102 to look right while capturing another image of their face, and then instructing the user 102 to look directly at the camera while capturing yet another image of their face, etc.). Prompting the user 102 to capture multiple images, videos, etc. of their face from different angles may be done for purposes of passing a liveness test (e.g., to make sure the user 102 of the electronic device 104 is not submitting a face image of someone else). Once the user 102 has captured an image(s), video(s), or other content representative of their face, the user 102 may submit the face image(s) 128 (or face video(s), or other content representative of their face) as part of a request to create a user account 118 with the service 108. The example of FIG. 1 depicts a first user interface 126(1) that presents the captured face image(s) 128 (e.g., for the user 102 to review before submitting), and that presents an interactive element 130 to submit the face image(s) 128 as part of a request to create a user account 118 with the service 108.

In some examples, the application 106 may prompt the user 102 for additional information before a user account 118 is created, such as an image (e.g., captured or scanned using a camera, a scanner, etc.) of another form of identification, such as a driver license (e.g., an image of the front of the driver license and/or an image of the back of the driver license). The driver license, for example, may include another face image, a name, a DOB, an address, a machine-readable code (e.g., a barcode), and/or other information, data, symbols, indicia, or the like. In some examples, the user 102 may manually input additional information that is requested by the application 106, such as by typing (e.g., providing input to a touch screen), speaking (e.g., providing input to a microphone), or the like.

In response to the user 102 selecting the interactive element 130 via the user interface 126(1), the electronic device 104 and/or the application 106 may transmit image data 132 representing the face of the user 102 to the service computing platform 110 over the network(s) 112. The service computing platform 110 may receive, from the electronic device 104 and/or the application 106, the face image data 132 in association with a request to create a user account 118 (e.g., an IDV attempt). In some examples, the face image data 132 corresponds to an image, video, or other content representative of the face of the user 102 captured via a camera of the electronic device 104 while the electronic device 104 is executing the application 106 associated with the service 108. Although, in the example of FIG. 1, the face image data 132 is received via the application 106, the face image data 132 may alternatively be received via any other suitable software executing on the electronic device 104, such as via a webpage, via an instant app (e.g., a portion of an application), or the like. In some examples, the user 102 submitting a face image 128 (or video, or other content representative of the face) may prompt a download of a full version of the application 106. Accordingly, a user's electronic device 104, in some examples, may not have the application 106 installed thereon at a time that the face image data 132 is received by the service computing platform 110, and the application 106 may be installed on the electronic device 104 at a later time (e.g., after the face image data 132 is received by the service computing platform 110). In other examples, a full version of the application 106 is installed on the electronic device 104 prior to the service computing platform 110 receiving the face image data 132, such as prior to, or during an early stage of, an onboarding process.

FIG. 1 further illustrates that additional data 134 may be received by the service computing platform 110 in association with the request to create the user account 118. In some examples, the additional data 134 includes additional image data, such as image data representing a driver license. In some examples, the additional data 134 is based on information input by the user 102 via the application 106 (e.g., by typing, speaking, etc.), perhaps in response to the application 106 prompting the user 102 for particular information, as mentioned above. In some examples, the additional data 134 may be provided to the service computing platform 110 by the electronic device 104 itself, without the user 102 providing such data. For example, particular data may be provided by software (e.g., an operating system (OS)) of the electronic device 104 (e.g., the OS may retrieve a payment card number, a bank account number, a personal name of the user, contacts of the user 102, or the like from memory of the electronic device 104, if such data 134 was previously stored in the memory). In some examples, the electronic device 104 may provide, to the service computing platform 110, device data associated with the electronic device 104, such as an identifier of the electronic device 104, an Internet Protocol (IP) address, and/or a geolocation. Accordingly, the additional data 134 may represent additional user data associated with the user 102 and/or device data associated with the electronic device 104. It is to be appreciated that the consent of the user 102 may be obtained before such data 134 is transmitted to the service computing platform 110.

In some examples, to minimize friction and improve user interaction with the payment application 106, the onboarding process may request minimal data from an onboarding user. For example, the service computing platform 110 may be configured to verify the identity of the user 102, even without receiving the additional data 134 from the electronic device 104 and/or the application 106 at a time of onboarding. In some examples, the face image data 132 and additional image data, for example representing a driver license (with user information printed thereon), may be sufficient for verifying the identity of the user 102, without the service computing platform 110 receiving any additional data from the electronic device 104 and/or the application 106 at a time of onboarding. However, because the service computing platform 110 has access to minimal data associated with the user 102 at the time of onboarding, in conventional technologies, it can be difficult to differentiate between legitimate and illegitimate users.

Upon receiving the face image data 132 (and possibly the additional data 134), the service computing platform 110 may process (e.g., analyze) and/or store the face image data 132 (and possibly the additional data 134) in the data store(s) 114. In an example, a liveness test is conducted using the face image data 132. The liveness test may be performed by the service computing platform 110, or the liveness test may be outsourced to a third-party service provider. The liveness test may be performed to confirm that the face image data 132 was generated as a result of a camera(s) of the electronic device 104 capturing an image of the face of the user 102 in real-time, as opposed to, say, an existing face image that was obtained from the dark net, or image data generated as a result of the user 102 taking a picture of an existing picture of a face. If the face image data 132 does not pass the liveness test, the user's 102 request to create a user account 118 with the service 108 may be denied without further processing of the face image data 132. In this scenario, the application 106 may prompt the user 102 to "try again" by requesting that the user 102 capture another image(s), video(s), etc. of their face.

As shown in FIG. 1, the service 108 may include one or more machine learning models 136, an IDV component 138, and a user onboarding component 140. The IDV component 138, the user onboarding component 140, and the service 108 itself, may represent computer-executable instructions that, when executed by a processor(s), cause performance of one or more operations described herein. The IDV component 138 may be configured to verify the identity of the user 102 who is requesting to access the service 108 (e.g., requesting to create a user account 118), and the user onboarding component 140 may be configured to guide the user 102 through an onboarding process via a series of user interfaces of the application 106, such as the user interfaces 126 shown in FIG. 1. In some examples, one or more of these components may utilize the trained machine learning model(s) 136 to perform these and/or other tasks.

Machine learning generally involves processing a set of examples (called "training data" or a "training dataset") in order to train a machine learning model(s). A machine learning model(s) 136, once trained, is a learned mechanism that can receive new data as input and estimate or predict a result as output. In the context of present disclosure, the unknown input data may be the face image data 132 associated with a user 102, and the trained machine learning model(s) 136 may be tasked with generating a representation 124 of the face depicted in the face image data 132. As mentioned above, this AI-generated face representation 124 may be a numerical representation, such as an embedding, which represents the face of the requesting user 102. Thus, in the context of an IDV attempt, the IDV component 138 may determine, based at least in part on the face image data 132 and using the trained machine learning model(s) 136, a representation 124 of the face of the user 102. For example, the IDV component 138 may provide the face image data

132 as input to the trained machine learning model(s) 136, and the trained machine learning model(s) 136 may output the representation 124 of the face depicted in the face image data 132. In some examples, the AI-generated face representation may be output as an n-dimensional feature vector ("n" being any suitable integer) within the latent space associated with the trained machine learning model(s) 136, wherein the latent space represents the compressed data that is stored by the model(s) 136 as the model(s) 136 learns the features of the training dataset.

After using the trained machine learning model(s) 136 to determine the representation 124 of the face of the user 102 based on the face image data 132, the IDV component 138 may search for AI-generated face representations 124 that are associated with (e.g., similar to) the representation 124 of the face of the user 102. For example, a plurality of AI-generated face representations 124 may be stored in the data store(s) 114, each AI-generated face representation 124 representing a face depicted in a face image that was previously received by the service computing platform 110. To illustrate, image data representing faces can be collected by the service computing platform 110 over time as new users are onboarded to the service 108 and/or as existing users of the service 108 submit face images to the service computing platform 110, and this face image data can be processed using the trained machine learning model(s) 136 to generate face representations 124, which are then stored in, and accessible from the data store(s) 114. A determination of whether to approve or deny the user's 102 request may be based at least in part on whether any AI-generated face representations 124 that are associated with (e.g., similar to) the AI-generated face representation 124 of the user 102 can be identified within the data store 114. For example, if no associated (e.g., similar) AI-generated face representations 124 are identified upon searching the data store(s) 114, this failure to identify similar AI-generated face representations 124 may indicate that the user 102 has not previously submitted a face image to the service computing platform 110, and, as a result, and after verifying the identity of the user 102 through additional IDV checks (e.g., verifying the information extracted from additional data 134 (e.g., additional image data representing a driver license), the user's 102 request may be approved. On the other hand, if one or more AI-generated face representations 124 that are associated with (e.g., similar to) the AI-generated face representation 124 of the user 102 are identified upon searching the data store(s) 114, this can be indicative of a fraudulent attempt to access the service 108 (e.g., an attempt to create an illegitimate user account).

For example, the IDV component 138, upon finding a similar AI-generated face representation(s) 124 in the data store(s) 114, may evaluate additional information to determine how to respond to the user's 102 request. For example, in an example where the service computing platform 110 received additional data 134 in association with the request to access the service 108 (e.g., the request to create a new user account 118 with the service 108), the IDV component 138 may determine first information based at least in part on the additional data 134. For example, if the additional data 134 includes additional image data representing a driver license, this additional image data may be analyzed to determine (e.g., extract) the first information (e.g., a name, a DOB, etc.) associated with the user 102. That is, image analysis techniques (e.g., text recognition (e.g., Optical Character Recognition (OCR)), code recognition, face recognition, etc.) can be applied to the image of the driver license to recognize a name, a DOB, an address, identifiers (e.g., from machine-readable codes printed on the driver license), or the like. The IDV component 138 may also determine (e.g., look up) second information associated with the similar AI-generated face representation(s) 124 found in the search of the data store(s) 114. For example, the similar AI-generated face representation(s) 124 returned in the search results may correspond to one or more existing user accounts 118, which may be associated with user data 120 and/or device data 122, and this user data 120 and/or device data 122 may be accessed to determine the second information, such as a name(s), a DOB(s), etc. associated with the existing user accounts 118. The IDV component 138 can then compare the first information and the second information. If the first information is the same as, or substantially corresponds to, the second information, this may be indicative of a legitimate user 102 attempting to create a duplicative user account. In some examples, the first information and the second information can be determined to be the same or substantially corresponding if differences between the information are below or do not satisfy a threshold. In some examples, individual information pieces can be weighted with different weights, which can be factored into a similarity analysis. For example, pieces of information that are known to have relatively high variability, such as names, may be assigned lower weights such that differences in such pieces of information with relatively high variability may not influence the evaluation of the information as heavily as other pieces of information that are known to have relatively low variability, such as SSNs, which may be assigned higher weights accordingly. In other words, a difference between two SSNs may be more indicative of a fraudulent request than a difference between two names of a user(s). In some examples, a similarity algorithm(s) is/are used in the evaluation of information differences, such as Euclidean Distance algorithm, a Cosine Similarity algorithm, a Pearson's Correlation Coefficient algorithm, or the like. In an example where the first information is obtained from image data representing a driver license, and the second information was obtained from image data representing previously-received images of driver licenses, state-specific requirements (e.g., laws, regulations, etc.) may be considered (e.g., learned) to determine information differences. In an example where the first information and the second information are the same or substantially correspond, the user 102 may have forgotten that he/she already setup an existing user account 118), and the service 108 may notify the user 102 of this existing user account 118 (so that the user 102 does not inadvertently create another user account 118). In some examples, the IDV component 138 may cause the application 106 to prompt the user 102 to enter credentials to login to the existing user account 118, which inherently mitigates access to existing user accounts 118 by fraudsters.

If, on the other hand, the IDV component 138 determines a difference(s) (e.g., a discrepancy(ies)) between the first information and the second information, and/or that the information differences satisfy a threshold, the user's 102 request may be denied or interrupted. In some examples, the IDV component 138 can compare the first information and the second information to determine whether the first information and the second information are the same or substantially corresponding. If differences between the information satisfy or exceed a threshold, the first information and the second information can be determined to be different. In some examples, individual information pieces can be weighted with different weights, which can be factored into a similarity analysis. In some examples, the IDV component 138 may perform image processing/parsing to determine whether a face depicted in the face image data 132 matches a face depicted in a face image on a driver license included in the additional data 134, which could help identify fake driver licenses for fraud detection. In an example where the first information and the second information are determined to be different (and/or if the face in the face image data 132 does not match the face depicted in the face image on the driver license), the user's 102 request may be classified as a fraudulent request, and the user 102 may be denied the ability to access the service 108, such as by denying the user's 102 request to create a new user account 118. Further, in some examples, instead of denying the request, the IDV component 138 can interrupt the request and, in some examples, request additional information from the user 102, prompt the user 102 to perform one or more additional actions, or the like. In some examples, instead of denying or interrupting the request, the IDV component 138 can grant the user's 102 request but can limit the features or functionalities granted to the user 102 from the service 108.

In the illustrative example of FIG. 1, upon submitting the face image 128 via the example first user interface 126(1), the application 106 transitions to the second user interface 126(2), which indicates that the user's request was denied or otherwise interrupted. As described above, this may be the case where the IDV component 138 found a similar AI-generated face representation(s) 124 amongst the AI-generated face representations 124 in the data store(s) 114, and subsequently determined a difference(s) (e.g., a discrepancy(ies)) between first information associated with the requesting user 102 and second information associated with the similar AI-generated face representation(s) 124, and/or that the information differences satisfy a threshold. For example, the additional data 134 received by the service computing platform 110 may include image data representing a driver license that includes a first name and a first DOB, among other first information, and the IDV component 138, upon searching the AI-generated face representations 124 in the data store 114 based on the AI-generated face representation 124 of the user 102, may have found a similar AI-generated face representation 124 associated with an existing user account 118, and the user data 120 associated with that existing user account 118 may include second information, such as a second name and/or a second DOB that is different than the first name and/or the first DOB, which indicates that the user 102 is attempting to create an illegitimate user account. In some examples, the second user interface 126(2) presents an interactive element 142 that, upon selection, reveals information that provides an explanation for denying or otherwise interrupting the user's 102 request. Accordingly, if the user 102 wants to learn more about why their request to access the service 108 was denied or interrupted, the user 102 can select the interactive element 142. The denial or interruption of the user's 102 request to access the service 108 in the example of FIG. 1 mitigates or reduces the extent of fraud on the service computing platform 110 by making it difficult for fraudsters to access the service 108 (e.g., by creating illegitimate user accounts with the service 108).

Figure 2:
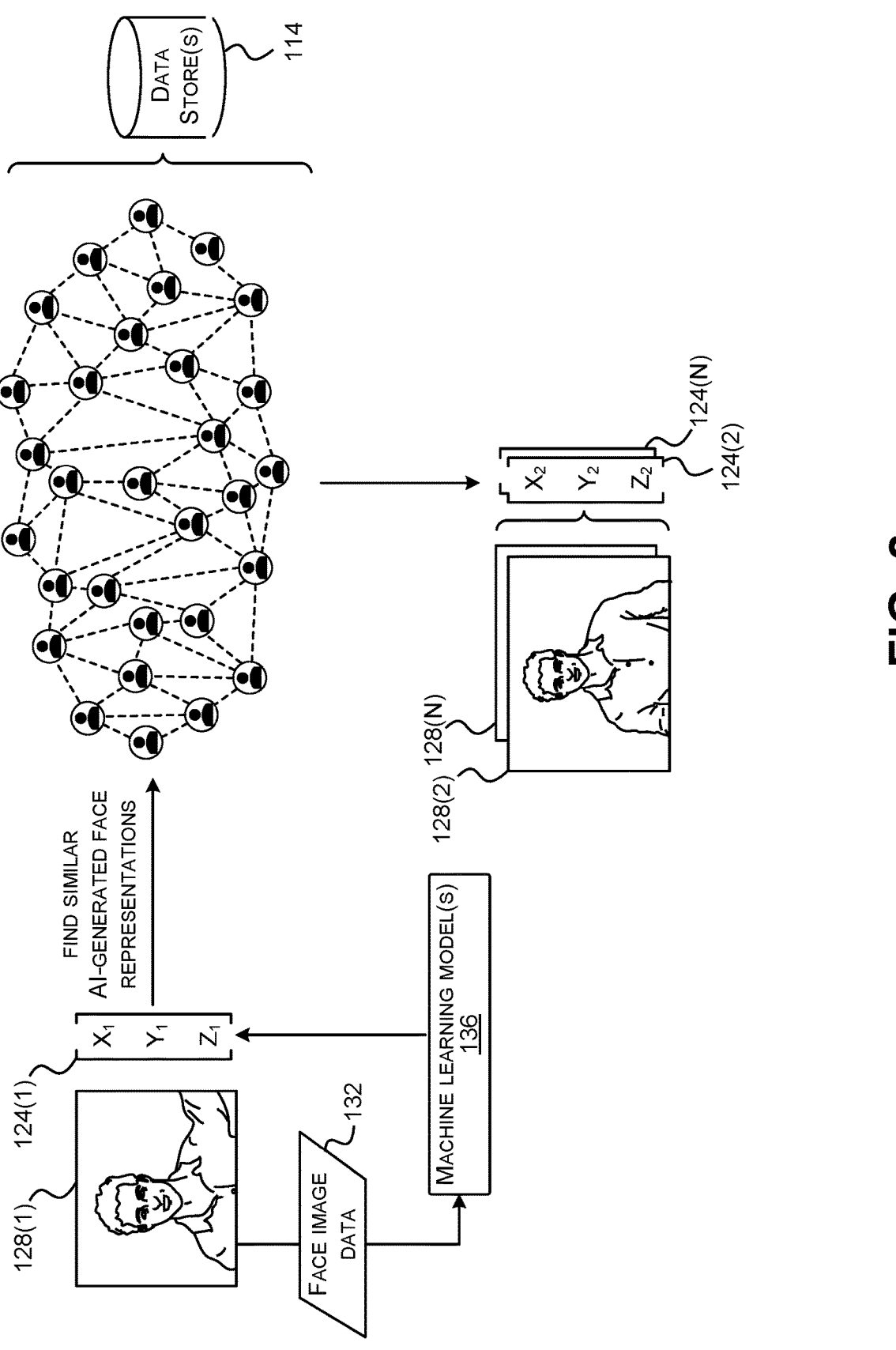
FIG. 2 is an example diagram illustrating a face grouping technique, according to an implementation of the present subject matter.

FIG. 2 is an example diagram illustrating a face grouping technique, according to an implementation of the present subject matter. As depicted in FIG. 2, image data 132 representing a face of a user 102 is provided as input to the trained machine learning model(s) 136. For example, the user 102 may have submitted a face image 128(1) (or video, or other content representative of the face) in association with a request to access the service 108 (e.g., a request to create a new user account 118), the service computing platform 110 may have received the face image data 132, and the IDV component 138 may then provide the face image data 132 as input to the trained machine learning model(s) 136. The trained machine learning model(s) 136 may generate, as output, a representation 124(1) of the face depicted in the face image data 132. In some examples, the trained machine learning model(s) 136 represents a neural network(s), such as a generative model(s) (e.g., a generative adversarial network (GAN)). However, the trained machine learning model(s) 136 may be implemented as any type of machine learning model including, without limitation, a neural network (e.g., a deep neural network (DNN), a recurrent neural network (RNN), etc.), a generative model (e.g., a GAN), a tree-based model (e.g., an extreme Gradient Boosting (XGBoost) model), a support vector machine (SVM), a kernel method, a random forest, a spline (e.g., a multivariate adaptive regression spline), a hidden Markov model (HMM), a Kalman filter (or enhanced Kalman filter), a Bayesian network (or a Bayesian belief network), a multilayer perceptrons (MLP), an expectation maximization algorithm, a genetic algorithm, a linear regression algorithm, a nonlinear regression algorithm, a logistic regression-based classification model, or an ensemble thereof. Further, the trained machine learning model(s) 136 can represent a single model or an ensemble of base-level machine learning models. An "ensemble" can comprise a collection of machine learning models 136 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The training dataset that is used to train the machine learning model 136 may include various types of data, including previously collected face image data, such as face image data associated with users of the service 108. In general, a training dataset for machine learning can include two components: features and labels. However, the training dataset used to train the machine learning model(s) 136 may be unlabeled, in some embodiments. Accordingly, the machine learning model(s) 136 may be trainable using any suitable learning technique, such as supervised learning, unsupervised learning, semi-supervised learning, self-supervised learning, reinforcement learning, and so on. The features included in the training dataset can be represented by a set of features, such as in the form of an n-dimensional feature vector of quantifiable information about an attribute of the training dataset. As part of the training process, weights may be set for machine learning. These weights may apply to a set of features included in the training data, as derived from historical data (e.g., previously collected face image data) in the data store(s) 114. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the output of the trained machine learning model 136.

As depicted in FIG. 2, the data store(s) 114 may be searched for AI-generated face representations 124 that are associated with (e.g., similar to) the AI-generated face representation 124(1). In some examples, similarity between a pair of AI-generated face representations 124 may be measured using a distance metric, where a greater distance between a pair of AI-generated face representations 124 indicates that the AI-generated face representations 124 are less similar (or more different), and a smaller distance between a pair of AI-generated face representations 124 indicates that the AI-generated face representations 124 are more similar (or less different). To illustrate, if a first AI-generated face representation 124(1) is expressed as a first point in a latent space of the trained machine learning model(s) 136, and if a second AI-generated face representation 124(2) is expressed as a second point in a latent space of the trained machine learning model(s) 136, the similarity between the pair of AI-generated face representations may be determined as a distance corresponding to a magnitude of a vector from the first latent space point to the second latent space point, or vice versa. Accordingly, the data store(s) 114 may be searched for AI-generated face representations 124 that are within a threshold distance from the AI-generated face representation 124(1) of the user 102.

In some examples, the AI-generated face representation 124(1) of the user 102 is used to perform an approximate nearest neighbor search of the plurality of AI-generated face representations 124 in the data store(s) 114. For example, the AI-generated face representations 124 in the data store(s) 114 may be preprocessed into an efficient index to speed up the search and/or make the search more efficient. Examples of approximate nearest neighbor search techniques that can be used to create an index for searching the data store(s) 114 include Annoy and Faiss. These are merely examples of approximate nearest neighbor search methodologies, and other types of approximate nearest neighbor search techniques can be implemented herein. In the example of FIG. 2, the subset of one or more AI-generated face representations 124(2) to 124(N) returned as a search result may be based at least in part on the approximate nearest neighbor search of the data store(s) 114. The subset of one or more AI-generated face representations 124(2) to 124(N) may be considered to be "similar to" the AI-generated face representation 124(1) of the user 102.

In some examples, the result of the approximate nearest neighbor search may be filtered, such as by removing or discarding, from the approximate nearest neighbor search result, one or more AI-generated face representations 124 that are not within a threshold distance from the AI-generated face representation 124(1) of the user 102. To illustrate, the approximate nearest neighbor search may return a superset of AI-generated face representations 124, and a distance calculation may be performed to determine a distance between the AI-generated face representation 124(1) of the user 102 and each AI-generated face representation 124 in the returned superset. The AI-generated face representations 124 associated with calculated distances that satisfy (e.g., meet or exceed, or strictly exceed) a threshold distance may be filtered out, or removed, from the search result as a consequence of not "making the cut" with respect to similarity. After this filtering step, the remaining AI-generated face representation(s) 124 that do not satisfy the threshold distance may be considered to be associated with (e.g., similar to) the AI-generated face representation 124(1) of the user 102. Accordingly, the subset of one or more AI-generated face representations 124(2) to 124(N) depicted in FIG. 2 may represent those AI-generated face representation(s) 124 that remain after filtering the approximate nearest neighbor search result based on a threshold distance. As mentioned above, if the AI-generated face representations 124 represent respective points in a latent space of the trained machine learning model(s) 136, the distance calculation to determine the individual distances may include determining a distance that corresponds to a magnitude of a vector from the latent space point corresponding to the AI-generated face representation 124(1) of the user 102 to a latent space point corresponding to the AI-generated face representation 124 returned in the approximate nearest neighbor search.

In some examples, the trained machine learning model(s) 136 is trained to determine the aforementioned threshold distance that is used to determine if a pair of AI-generated face representations 124 are associated with (e.g., similar to) each other for purposes of implementing the face grouping techniques described herein. For example, the trained machine learning model(s) 136 may learn to increase the threshold distance to err on the side of determining an overinclusive subset of AI-generated face representations 124 that are considered to be "similar to" the AI-generated face representation 124(1) of the user 102. This might increase the probability of the subset of one or more AI-generated face representations 124(2) to 124(N) including an AI-generated face representation 124 of a user who is not the same person as the requesting user 102, but it also reduces the probability of failing to identify a face image previously-submitted by the requesting user 102. On the other hand, the trained machine learning model(s) 136 may learn to decrease the threshold distance to err on the side of determining an underinclusive of AI-generated face representations 124 that are considered to be "similar to" the AI-generated face representation 124(1) of the user 102. This might reduce the probability of the subset of one or more AI-generated face representations 124(2) to 124(N) including an AI-generated face representation 124 of a user who is not the same person as the requesting user 102, but it also increases the probability of failing to identify a face image previously-submitted by the requesting user 102, which, in turn, may increase the probability of granting a fraudster access to the service 108. Over time, as feedback regarding the face grouping accuracy is provided to the system, the trained machine learning model(s) 136 may determine the optimal threshold distance to use for determining whether a pair of AI-generated face representations 124 are associated with (e.g., similar to) each other.

As shown in FIG. 2, the subset of one or more AI-generated face representations 124(2) to 124(N) identified upon searching the data store(s) 114 may represent one or more faces depicted in one or more face images 128(2) to 128(N) that were previously received by the service computing platform 110. For example, the service computing platform 110 may have received the face image(s) 128(2) to 128(N) in association with previous requests to access the service 108 (e.g., previous requests to create user accounts 118). In the example of FIG. 2, the determination of the subset of one or more AI-generated face representations 124(2) to 124(N) may be indicative of a fraudulent attempt to access the service 108 (e.g., an attempt to create an illegitimate user account). In order to determine if the request is a fraudulent request, further information may be evaluated.

Figure 3:
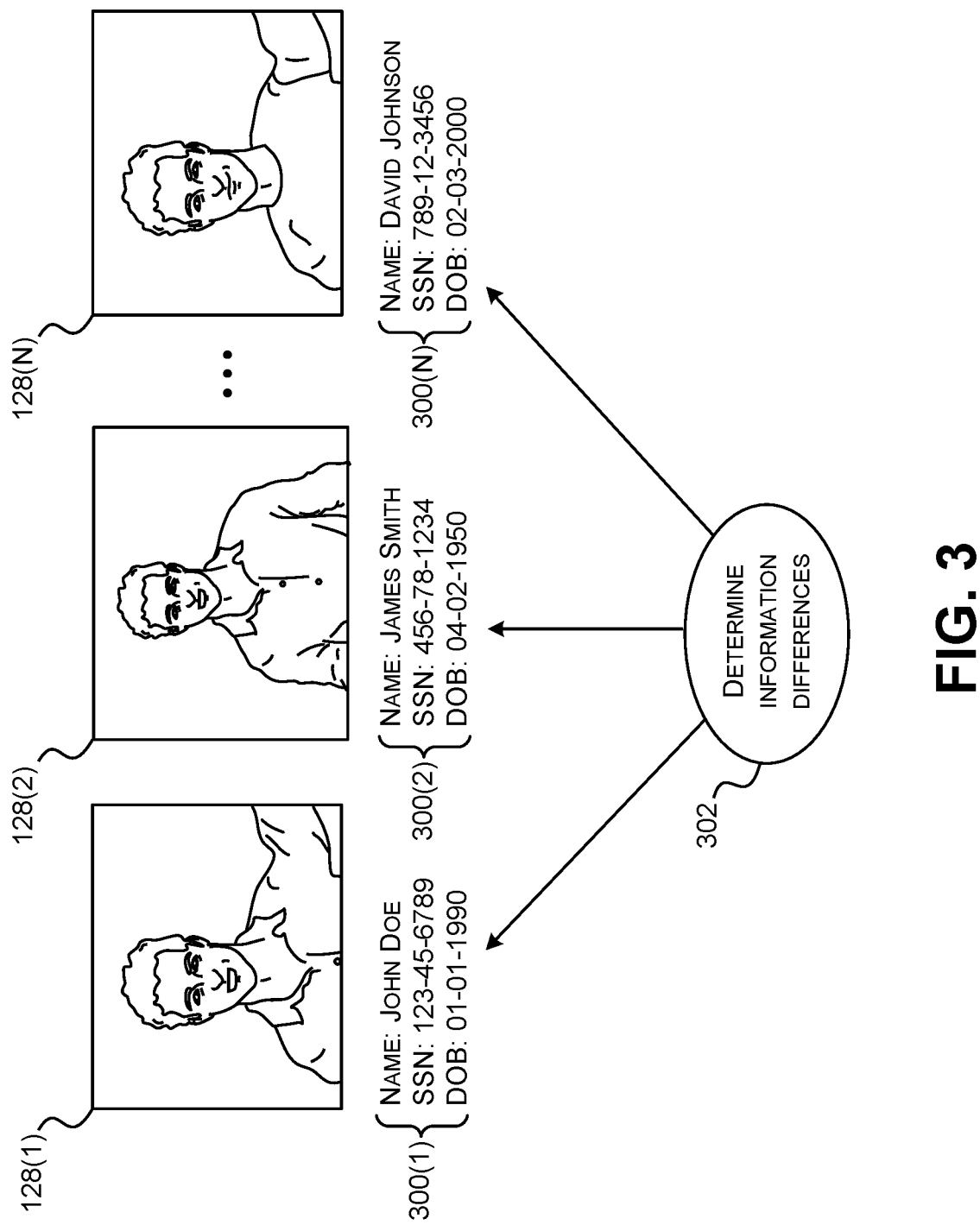
FIG. 3 is an example diagram illustrating a technique for determining differences between first information associated with a requesting user who submitted a face image and second information associated with existing user accounts that were identified using a face grouping technique, according to an implementation of the present subject matter.

FIG. 3 is an example diagram illustrating a technique for determining differences between first information associated with a requesting user 102 who submitted a face image 128(1) and second information associated with existing user accounts 118 that were identified using a face grouping technique, according to an implementation of the present subject matter. The comparison of the first information and the second information may be performed to determine whether the user's 102 request to access the service 108 is likely a fraudulent request or a legitimate request. In FIG. 3, the face image 128(1) submitted by the requesting user 102 is shown next to face images 128(2) to 128(N) that were previously received by the service computing platform 110 and that depict faces that were determined to be similar to the face depicted in the face image 128(1). That is, the face images 128(2) to 128(N) correspond to the subset of AI-generated face representations 124(2) to 124(N) that were determined to be associated with (e.g., similar to) the AI-generated face representation 124(1) of the requesting user 102 based on the face grouping technique described above with reference to FIG. 2.

With reference to the example of FIG. 3, the IDV component 138, upon finding the similar AI-generated face representation(s) 124(2) to 124(N) (corresponding to the face images 128(2) to 128(N)), may determine first information 300(1) and second information 300(2) to 300(N), and the IDV component 138 may evaluate the first information 300(1) and the second information 300(2) to 300(N), such as by comparing the first information 300(1) and the second information 300(2) to 300(N). To illustrate, in an example where the service computing platform 110 received additional data 134 in association with the request to access the service 108 (e.g., the request to create a new user account 118 with the service 108), the IDV component 138 may determine the first information 300(1) based at least in part on the additional data 134. For example, if the additional data 134 includes additional image data representing a driver license, this additional image data may be analyzed to determine (e.g., extract) the first information 300(1) (e.g., a name of "John Doe", a SSN of "123-45-6789", a DOB of "Jan. 1, 1990", etc.) associated with the user 102. Various techniques, such as image analysis techniques (e.g., text recognition (e.g., OCR), code recognition, face recognition, etc.) can be applied to the image of the driver license to recognize the first information 300(1). In another example, the additional data 134 may include device data 122 associated with the electronic device 104 that submitted the request to access the service 108, and the first information 300(1) determined based on the device data 122 may include an identifier of the electronic device 104, or any other suitable information about the electronic device 104.

The IDV component 138 may also determine (e.g., look up) the second information 300(2) to 300(N) associated with the similar AI-generated face representation(s) 124(2) to 124(N) found in the search of the data store(s) 114. For example, the similar AI-generated face representation(s) 124(2) to 124(N) returned in the search results may correspond to one or more existing user accounts 118, which may be associated with user data 120 and/or device data 122, and this user data 120 and/or device data 122 may be accessed (e.g., from the data store(s) 114) to determine the second information 300(2) to 300(N). In the example of FIG. 3, a first instance of the second information 300(2) includes a name of "James Smith," a SSN of "456-78-1234," and a DOB of "04-02-1950," and a second instance of the second information 300(N) includes a name of "David Johnson," a SSN of "789-12-3456," and a DOB of "02-03-2000." The second information 300(2) to 300(N) may additionally, or alternatively, include device information associated with electronic devices 104 that previously submitted the face images 128(2) to 128(N), such as device identifiers (e.g., media access control (MAC) addresses), or any other suitable device information.

The IDV component 138 can then compare the first information 300(1) and the second information 300(2) to 300(N) to determine information differences (e.g., discrepancies) at 302. In the example of FIG. 3, by comparing the first information 300(1) and the second information 300(2) to 300(N), the IDV component 138 may determine that the name "John Doe" is different than the name "James Smith" and/or different than the name "David Johnson," and/or that the SSN of "123-45-6789" is different than the other SSNs, and/or that the DOB of "Jan. 1, 1990" is different than the other DOBs. In some examples, evaluating information differences at 302 may include determining whether differences between the first information 300(1) and the second information 300(2) satisfy a threshold. Utilizing a threshold (e.g., a threshold number of differences, a threshold score, etc.) at 302 to evaluate the information differences may account for a user who has different names (e.g., a formal name or full name vs. an informal name, shortened name, or nickname), or for mailing addresses provided differently (e.g., 123 Broadway, Lot A vs. 123 Broadway). In other words, some information differences, or some level of information differences, may be acceptable and/or may not be indicative of a fraudulent request. The determined difference(s) (e.g., a discrepancy(ies)) between the first information 300(1) and the second information 300(2) to 300(N), and/or a determination that the information differences satisfy a threshold, may indicate that the user's 102 request to access the service 108 is a fraudulent request, and the user's 102 request may be denied or otherwise interrupted as a result of the determined information differences. In other words, in the example of FIGS. 1 to 3, upon receiving the user's 102 request to access the service 108, the service computing platform 110 determined that it has "seen" the user's 102 face in the past, and that the user 102 is now submitting different information than the information the service computing platform 110 received from the user 102 in the past, which is indicative of a fraudulent request to access the service 108. In some examples, instead of denying or interrupting the request based on determining information differences at 302, the IDV component 138 can accept the user's 102 request but can restrict the user's 102 access to the service 108 by limiting the features or functionalities granted to the user 102 from the service 108.

In some examples, the information 300 may be processed as one or more tokens for purposes of verifying the identity of the user 102 through implementation of an IDV process. For example, after performing the face grouping technique described above with reference to FIG. 2, the IDV component 138 may obtain a list of tokens, including a face grouper token indicating a number of similar faces found in the data store(s) 114, wherein the similar faces may be associated with past attempts to access the service 108 (e.g., face images 128 submitted in past requests to create user accounts). In some examples, the list of tokens may include one or more additional tokens, such as device token, a SSN token, or the like. For example, the device token may indicate a number of previous requests to access the service 108 from the electronic device 104 (e.g., based on the identifier of the electronic device 104). As another example, the SSN token may indicate a number of times the SSN of the user 102 was submitted in association with previous requests to access the service 108. In these examples, the IDV component 138 may, for instance, determine, from the device token, that an existing user account 118 was created in association with a request received from the same electronic device 104, even though a face image submitted in association with that request depicts a face that is different than the user's 102 face. In other words, the additional tokens (e.g., the device token, the SSN token, etc.) can allow for detecting fraud based on other detection methods besides face grouping, which may provide a more robust IDV solution. Accordingly, in some examples, the information 300 retrieved using these additional tokens may be considered by the IDV component 138 in determining information differences at 302 of FIG. 3.

In some examples, the IDV component 138 may utilize a model(s), such as a trained machine learning model(s), to determine information differences at 302 of FIG. 3. In some examples, a plurality of different signals may be provided to the model(s) as input to determine information differences at 302 of FIG. 3. For instance, the IDV component 138 may utilize such a model(s) to determine name similarity or consistency, DOB similarity or consistency, and/or SSN similarity or consistency, to name a few examples. In some examples, the IDV component 138 may utilize the model(s) to analyze the span of DOBs across multiple user accounts 118 that are returned, or the like. In some examples, the model(s) used by the IDV component 138 to determine information differences at 302 of FIG. 3 may output a classification associated with the user's 102 request, such as a classification of the request as a fraudulent request or a legitimate request.

If a request to access the service 108 is denied, the denial may be implemented in various ways. In the example of FIG. 1, a user interface 126(2) of the application 106 presents information indicating that the request was denied, which informs the user 102 that the request was denied. In some examples, the request may be denied, but the user 102 may not be informed of the denial. In this scenario, the user 102 whose request was denied (likely a fraudster) may be guided through part of an onboarding process by the user onboarding component 140 without allowing the user 102 to complete the onboarding process. This may allow for gathering further information that may be valuable to learn behaviors of fraudsters to enhance fraud detection. This approach may also prevent the user 102 from immediately retrying to create an illegitimate user account, for example, thereby alleviating the burden on the service computing platform 110 by reducing a number of repeat IDV attempts that are processed by the service computing platform 110 at a given time.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 is an example process 400 for using face grouping for fraud reduction, according to an implementation of the present subject matter. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 400. The process 400 can be implemented by a system including one or more processors and memory storing computer-executable instructions to cause the one or more processors to perform the process 400. In some examples, the process 400 can be implemented by a processing device(s) (e.g., server(s)) of the service computing platform 110. For discussion purposes, the process 400 is described with reference to the previous figures.

At 402, image data 132 and additional data 134 is received in association with a request to access a service 108 (e.g., a payment service). In some examples, a service computing platform 110 associated with the service 108 (e.g., a server computing device and/or a processor(s) thereof) may receive the image data 132 and the additional data 134 at block 402. In some examples, the image data 132 and the additional data 134 is received from an electronic device 104 and/or from an application 106 (e.g., a payment application) executing on the electronic device 104, the application 106 being associated with the service 108. In some examples, the request to access the service 108 is a request to create a user account 108 with the service 108. For example, the request to access the service 108 may be part of an onboarding process for onboarding a user 102 to the service. Accordingly, the request to access the service 108 may be a request to sign-up for a user account 118 with the service 108 or to otherwise register with the service 108. In some examples, the request to access the service is associated with an IDV attempt, such as a document IDV attempt where a user 102 is submitting one or more "documents," such as an image of a face of the user 102 and/or an image of a driver license, etc. In some examples, the service computing platform 110 (e.g., via the user onboarding component 140) may cause a user interface 126(1) of the application 106 to present an interactive element 130 for submitting a face image(s) 128 prior to receiving the image data 132, such as after prompting the user 102 to capture the face image(s) 128 (e.g., from different angles). The image data 132 received at block 402 may represent a face of a user 102 (e.g., a user 102 of the electronic device 104 from which the image data 132 is received). In some examples, the image data 132 corresponds to an image, video, or other content representative of the face of the user captured via a camera of the electronic device 104 while the electronic device 104 is executing the application 106 associated with the service 108. In some examples, the additional data 134 received at block 402 includes additional user data associated with the user 102 of the electronic device 104 from which the additional data 134 is received. For example, the additional data 134 may include additional image data, such as image data representing a driver license, and/or additional user data based on information input by the user 102 via the application 106 (e.g., by typing, speaking, etc.), perhaps in response to the application 106 prompting the user 102 for particular information. In some examples, the additional data 134 includes device data 122 associated with the electronic device 104 from which the additional data 134 is received, such as a device identifier (e.g., MAC address), or the like.

At 404, a representation 124(1) of the face of the user 102 is determined based at least in part on the image data 132 received at block 402 using a trained machine learning model(s) 136. In some examples, the service computing platform 110 (e.g., a server computing device and/or a processor(s) thereof) may determine the AI-generated face representation 124(1) at block 404. In some examples, the AI-generated face representation 124(1) is determined at block 404 by analyzing the image data 132 using the trained machine learning model(s) 136. The AI-generated face representation 124(1) determined at block 404 may be a numerical representation, such as an embedding, that represents the face of the user 102. In some examples, the AI-generated face representation 124(1) is determined at block 404 as a point in a latent space of the trained machine learning model(s) 136. In some examples, the image data 132 may be processed to determine whether the image data 132 passes a liveness test prior to determining the AI-generated face representation 124(1) at block 404.

At 406, a search for AI-generated face representations 124 associated with (e.g., similar to) the AI-generated face representation 124(1) determined at block 404 may be performed. In some examples, the service computing platform 110 (e.g., a server computing device and/or a processor(s) thereof) may perform the search at block 406. In some examples, a data store(s) 114 storing a plurality of AI-generated face representations 124 may be accessed and searched at block 406 using the AI-generated face representation 124(1) determined at block 404 as input to the search (e.g., as a search query).

At 408, a determination may be made as to whether any AI-generated face representations 124 associated with (e.g., similar to) the AI-generated face representation 124(1) determined at block 404 are found. In some examples, the service computing platform 110 (e.g., a server computing device and/or a processor(s) thereof) may determine whether any associated (e.g., similar) AI-generated face representations 124 are found. If no associated (e.g., similar) AI-generated face representations 124 are found during the search, the process 400 may follow the NO route from block 408 to block 410.

At 410, a determination may be made as to whether an identity of the user 102 is verified. In some examples, the service computing platform 110 (e.g., a server computing device and/or a processor(s) thereof) may determine whether the identity of the user 102 is verified. In some examples, IDV of the user 102 at block 410 may be based at least in part on the additional data 134 received at block 402, such as additional image data representing a driver license. For example, a code printed on the driver license may be scanned by processing the additional image data to determine whether information (e.g., a name, a DOB, etc.) printed on the driver license matches information in a database of a licensing agency. In some examples, the IDV check at block 410, or at least a portion thereof, may be outsourced to a third party service provider. In some examples, IDV of the user 102 at block 410 may utilize tokens, such as the device token, the SSN token, or the like, as described above. That is, if the additional data 134 received at block 402 includes device data 122 indicating a device identifier of the electronic device 104, the device token may indicate whether any previous requests to access the service 108 were received from the same electronic device 104. If, at block 410, the identity of the user 102 is verified, the process 400 may follow the YES route from block 410 to block 412, where the request to access the service 108 is accepted or otherwise approved. If, at block 410, the identity of the user 102 is not verified, the process 400 may follow the NO route from block 410 to block 414, where the request to access the service 108 can be denied, interrupted, or accepted while restricting the user's 102 access to the service 108.

Returning to block 408, if one or more associated (e.g., similar) AI-generated face representations 124(2) to 124(N) are determined (e.g., found during the search), the process 400 may follow the YES route from block 408 to block 416. The AI-generated face representation(s) 124(2) to 124(N) determined (e.g., found during the search) at block 408 may be a numerical representation(s), such as an embedding(s), that represents a face(s) similar to the face of the user 102. In some examples, the AI-generated face representation(s) 124(2) to 124(N) determined (e.g., found during the search) at block 408 may correspond to a point(s) in the latent space of the trained machine learning model(s) 136.

At 416, first information 300(1) is determined based at least in part on the additional data 134 received at block 402. In some examples, the service computing platform 110 (e.g., a server computing device and/or a processor(s) thereof) may determine the first information 300(1) at block 416. In some examples, the first information 300(1) may include first PII. For example, if the additional data 134 includes additional image data representing a driver license, this additional image data may be analyzed to determine (e.g., extract) the first information 300(1) (e.g., a name, a SSN, a DOB, etc.) associated with the user 102. Various techniques, such as image analysis techniques (e.g., text recognition (e.g., OCR), code recognition, face recognition, etc.) can be applied to the image of the driver license to recognize the first information 300(1). In another example, the first information 300(1) may have been entered via the application 106, such as by the user 102 typing and/or speaking to enter the first information 300(1). In another example, the additional data 134 may include device data 122 associated with the electronic device 104 that submitted the request to access the service 108, and the first information 300(1) determined based on the device data 122 may include an identifier of the electronic device 104, or any other suitable information about the electronic device 104.

At 418, second information 300(2) to 300(N) is determined, the second information 300(2) to 300(N) being associated with the subset of one or more associated (e.g., similar) AI-generated face representations 124(2) to 124(N) determined (e.g., found during the search) at block 408. In some examples, the service computing platform 110 (e.g., a server computing device and/or a processor(s) thereof) may determine the second information 300(2) to 300(N) at block 418. In some examples, the second information 300(2) to 300(N) includes second PII. For example, the similar AI-generated face representation(s) 124(2) to 124(N) found during the search may correspond to one or more existing user accounts 118, which may be associated with user data 120 and/or device data 122, and this user data 120 and/or device data 122 may be accessed (e.g., from the data store(s) 114) to determine the second information 300(2) to 300(N) at block 418. In some examples, the second information 300(2) to 300(N) includes a name(s), a SSN(s), a DOB(s), etc. The second information 300(2) to 300(N) may additionally, or alternatively, include device information associated with electronic devices 104 that previously submitted the face images 128 corresponding to the associated (e.g., similar) AI-generated face representations 124(2) to 124(N) found during the search, such as device identifiers (e.g., MAC addresses), or any other suitable device information.

At 420, a determination may be made as to whether there are any differences between the first information 300(1) and the second information 300(2) to 300(N). In some examples, the service computing platform 110 (e.g., a server computing device and/or a processor(s) thereof) may evaluate information differences at block 420. In some examples, the evaluation of information differences (e.g., name differences. SSN differences, DOB differences, etc.) at block 420 may include comparing the first information 300(1) and the second information 300(2) to 300(N). In some examples, a model(s), such as a trained machine learning model(s), may be utilized to evaluate the information differences at block 420. In some examples, a plurality of different signals may be provided to the model(s) as input to determine information differences at block 420. For instance, such a model(s) may be utilized at block 420 to determine name similarity or consistency, DOB similarity or consistency, and/or SSN similarity or consistency, to name a few examples. In some examples, the model(s) may be utilized at block 420 to analyze the span of DOBs across multiple user accounts 118 that are returned. In some examples, the evaluation of information differences at block 420 may include verifying the identity of the user 102 based on the first information 300(1) and/or the second information 300(2) to 300(N) using an IDV process. For example, the first information 300(1) determined at block 416 may include a name, DOB, etc., which may have been obtained from additional image data of a driver license, and, at block 420, a code printed on the driver license may be scanned by processing the additional image data to determine whether the first information 300(1) (e.g., a name, a DOB, etc.) printed on the driver license matches information in a database of a licensing agency. In some examples, tokens may be utilized at block 420 to evaluate the information differences. For example, a list of tokens including a face grouper token and one or more additional tokens, such as device token, a SSN token, or the like, may be processed to verify the identity of the user 102 at block 420, as described above with reference to FIG. 3. In some examples, evaluating information differences at block 420 may include determining whether differences between the first information 300(1) and the second information 300(2) satisfy a threshold. Utilizing a threshold (e.g., a threshold number of differences, a threshold score, etc.) at block 420 to evaluate the information differences may account for a user who has different names (e.g., a formal name or full name vs. an informal name, shortened name, or nickname), or for mailing addresses provided differently (e.g., 123 Broadway. Lot A vs. 123 Broadway). In other words, some information differences, or some level of information differences, may be acceptable and may not be indicative of a fraudulent request. In some examples, a model(s) used at block 420 to determine information differences may output a classification associated with the user's 102 request, such as a classification of the request as a fraudulent request or a legitimate request. If one or more differences (e.g., discrepancies) are determined at block 420, and/or if the information differences satisfy a threshold, the process 400 may follow the YES route from block 420 to block 414.

At 414, the request to access the service 108 (e.g., the request to create a user account with the service 108) is denied or interrupted, or accepted while granting restricted access to the service 108, based at least in part on determining the difference(s) (e.g., discrepancy(ies)) at block 420. In some examples, the service computing platform 110 (e.g., a server computing device and/or a processor(s) thereof) may deny or interrupt the request, or accept the request with restricted access, at block 414. For example, the service computing platform 110 may cause the application 106 executing on the electronic device 104 to output an indication (e.g., via a user interface 126(2) of the application 106) that the request is denied or interrupted. In some examples, the service computing platform 110 may classify the request as a fraudulent request based at least in part on the difference(s) (e.g., discrepancy(ies)) determined at block 420, and the request is denied or interrupted at block 414 based at least in part on classifying the request as a fraudulent request. In this way, the process 400 may be implemented for reducing fraud in association with access to the service 108 (e.g., user account 118 creation). In some examples, interrupting the request at block 414 may be followed by a request for further information or data to be submitted (e.g., by the user 102, by the electronic device 104, etc.) before making a final determination to accept or deny the request. For example, the IDV component 138 may prompt the user 102 (e.g., via the application 106) to provide more information (e.g., additional identifying information, such as a SSN, a phone number, an email address, a mailing address, or the like). In some examples, interrupting the request at block 414 may include submitting the user's 102 request for further (e.g., more detailed or thorough) review before making a final determination to accept or deny the request. For example, the IDV component 138 may implement a more sophisticated or rigorous fraud detection methodology to determine (e.g., with higher confidence) whether a request is fraudulent, such as by accessing one or more third-party services for detecting fraud based on particular user data (e.g., a phone number, an email address, etc.). In some examples, at block 414, instead of denying or interrupting the request, the IDV component 138 can accept the user's 102 request but can restrict the user's 102 access to the service 108 by limiting the features or functionalities granted to the user 102 from the service 108. For example, the user 102 may be granted access to a shopping functionality of the service 108 (e.g., allowing the user 102 to browse items from merchants that are available for purchase via the application 106) and/or a messaging functionality of the service 108 (e.g., to chat with other users of the service 108 via the application 106), yet the user 102 may be denied access to other features or functionality, such as a P2P payment functionality (e.g., preventing the user 102 from making or receiving payments to or from other users of the service 108 via the application 106). It is to be appreciated that these are merely example ways of restricting access to the service 108, and the user 102 may be granted limited access to the service 108 in other ways at block 414.

If, at block 420, no differences (e.g., discrepancies) are determined, the process 400 may follow the NO route from block 420 to block 422. At 422, the user 102 may be notified of an existing user account 118 and/or the user 102 may be requested to login to the existing user account 118 using credentials (e.g., a username, password, biometrics (e.g., a fingerprint), etc.). In some examples, the service computing platform 110 (e.g., a server computing device and/or a processor(s) thereof) may cause the user 102 to be notified and/or cause the login credentials to be requested at block 422. For example, the service computing platform 110 may cause the application 106 executing on the electronic device 104 to output the notification and/or to request the credentials (e.g., via a user interface of the application 106).

FIG. 5 is an example process 500 for grouping a face representation 124(1) of a requesting user 102 with similar face representations 124(2) to 124(N), according to an implementation of the present subject matter. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 500. The process 500 can be implemented by a system including one or more processors and memory storing computer-executable instructions to cause the one or more processors to perform the process 500. In some examples, the process 500 can be implemented by a processing device(s) (e.g., server(s)) of the service computing platform 110. For discussion purposes, the process 500 is described with reference to the previous figures.

At 502, a representation 124(1) of a face is determined using a trained machine learning model(s) 136 based at least in part on image data 132 representing the face. In some examples, a service computing platform 110 associated with a service 108 (e.g., a server computing device and/or a processor(s) thereof) may determine the AI-generated face representation 124(1) at block 502. In some examples, the AI-generated face representation 124(1) is determined at block 502 by analyzing the image data 132 using the trained machine learning model(s) 136. The AI-generated face representation 124(1) determined at block 502 may be a numerical representation, such as an embedding, that represents the face. In some examples, the AI-generated face representation 124(1) is determined at block 502 as a point in a latent space of the trained machine learning model(s) 136. In some examples, the image data 132 was received in association with a request to access the service 108 (e.g., a request to create a user account 118 with the service 108).

At 504, an approximate nearest neighbor search of a plurality of AI-generated face representations 124 stored in a data store(s) is performed based at least in part on the AI-generated face representation 124(1) determined at block 502. In some examples, the service computing platform 110 (e.g., a server computing device and/or a processor(s) thereof) may perform the approximate nearest neighbor search at block 504. In some examples, the AI-generated face representation 124(1) determined at block 502 is used as input to the approximate nearest neighbor search (e.g., as a search query) performed at block 504. In some examples, the AI-generated face representations 124 in the data store(s) 114 may be preprocessed into an efficient index at block 504 (e.g., to speed up the search and/or make the search more efficient). Examples of approximate nearest neighbor search techniques that can be used at block 504 to create an index for searching the data store(s) 114 include Annoy and Faiss. These are merely examples of approximate nearest neighbor search methodologies, and other types of approximate nearest neighbor search techniques can be implemented herein.

At 506, a superset of AI-generated face representations 124 of the plurality of face representations in the data store(s) 114 is determined based at least in part on the approximate nearest neighbor search performed at block 504. In some examples, the service computing platform 110 (e.g., a server computing device and/or a processor(s) thereof) may determine the superset at block 506. In some examples, the AI-generated face representation 124(1) determined at block 502 is a first AI-generated face representation 124(1), and the superset determined at block 506 includes at least a second AI-generated face representation 124(2) (e.g., a representation of a second face) and a third AI-generated face representation 124(3) (e.g., a representation of a third face), and potentially additional AI-generated face representations 124 returned in the search result of the approximate nearest neighbor search.

At 508, distances are calculated between the first AI-generated face representation 124(1) and individual AI-generated face representations 124 in the superset determined at block 506. In some examples, the service computing platform 110 (e.g., a server computing device and/or a processor(s) thereof) may calculate the distances at block 508. In the running example, a first distance between the first AI-generated face representation 124(1) and the second AI-generated face representation 124(2) is calculated at block 508, a second distance between the first AI-generated face representation 124(1) and the third AI-generated face representation 124(3) is calculated at block 508, and so on and so forth, if additional AI-generated face representations 124 are included in the superset. As mentioned above, if the AI-generated face representations 124 represent respective points in a latent space of the trained machine learning model(s) 136, an individual distance calculation performed at block 508 may include determining a distance that corresponds to a magnitude of a vector from the latent space point corresponding to the first AI-generated face representation 124(1) to a latent space point corresponding to an individual AI-generated face representation 124 included in the superset (e.g., returned in the approximate nearest neighbor search).

At 510, the distances calculated at block 508 are compared to a threshold distance. In some examples, the service computing platform 110 (e.g., a server computing device and/or a processor(s) thereof) may compare the distances to the threshold distance. In some examples, the comparison to the threshold distance is performed to determine whether the individual distances satisfy the threshold distance. As used herein, a value can "satisfy" a threshold if the value is equal to or greater than the threshold or if the value is strictly greater than the threshold.

At 512, a subset of one or more AI-generated face representations 124(2) to 124(N) is determined from the superset based at least in part the distance(s) calculated for the subset failing to satisfy the threshold distance. In some examples, the service computing platform 110 (e.g., a server computing device and/or a processor(s) thereof) may determine the subset at block 512. In the running example, if the first distance between the first AI-generated face representation 124(1) and the second AI-generated face representation 124(2) fails to satisfy the threshold distance, the second AI-generated face representation 124(2) may be included in the subset, and if the second distance between the first AI-generated face representation 124(1) and the third AI-generated face representation 124(3) satisfies the threshold distance, the third AI-generated face representation 124(3) may be excluded from the subset. In other words, the second AI-generated face representation 124(2) may be considered to be associated with (e.g., similar to) the first AI-generated face representation 124(1) because it is closer to the first AI-generated face representation 124(1) than the third AI-generated face representation 124(3), and specifically because the first distance is less than or equal to, or strictly less than, the threshold distance. In some examples, the subset determined at block 512 may correspond to the associated (e.g., similar) AI-generated face representation(s) 124 determined (e.g., found in the search) following the YES route from block 408 of the process 400. That is, the process 400 may implement the process 500 to determine AI-generated face representations 124 that are associated with (e.g., similar to) the first AI-generated face representation

124(1) determined at block 404 of the process 400. The determination of the subset from the superset at block 512 may represent a filtering step for filtering the result of the approximate nearest neighbor search, such as by removing or discarding, from the approximate nearest neighbor search result, one or more AI-generated face representations 124 that are not within the threshold distance from the first AI-generated face representation 124(1). In some examples, the trained machine learning model(s) 136 is trained to determine the aforementioned threshold distance that is used at block 512. For example, the trained machine learning model(s) 136 may learn to adjust the threshold distance to an optimal threshold distance based on feedback regarding the face grouping accuracy that is received by the system.

FIG. 6 is an example process 600 for retraining a machine learning model(s) to reduce computing resource consumption and/or reduce latency without compromising face grouping accuracy, according to an implementation of the present subject matter. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 600. The process 600 can be implemented by a system including one or more processors and memory storing computer-executable instructions to cause the one or more processors to perform the process 600. In some examples, the process 600 can be implemented by a processing device(s) (e.g., server(s)) of the service computing platform 110. For discussion purposes, the process 600 is described with reference to the previous figures.

At 602, one or more first trained machine learning models 136 are generated utilizing face image data as a training dataset. In some examples, a service computing platform 110 associated with a service 108 (e.g., a server computing device and/or a processor(s) thereof) may generate the first trained machine learning model(s) 136 at block 602. The first trained machine learning model(s) 136 may be trained to generate N-dimensional representations of faces, where N is any suitable integer. Machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering. Bayesian networks, reinforcement learning, representation learning, similarity and metric learning, sparse dictionary learning, and/or rules-based machine learning. Face image data may be extracted from one or more databases, such as the datastore(s) 114, and may be utilized to predict patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Data analysis may include using one or more models, including for example one or more algorithms, to inspect the face image data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models. In some examples, the face image data utilized as the training dataset at block 602 may be collected from users who submit face images 128 during an onboarding process and/or during use of the service 108 after the onboarding process. In some examples, the face image data utilized as the training dataset is obtained from third party sources and/or services. Generating the training dataset utilized at block 602 may include formatting the face image data into input vectors and/or signals for the machine learning model to intake, as well as associating the various data with the outcomes (e.g., labeling users and/or user accounts 118 as associated with a particular face image. In some examples, the training dataset can include features and labels, or it may be unlabeled The features included in the training dataset can be represented by a set of features, such as in the form of a feature vector of quantifiable information about an attribute of the training dataset. Generation of the first trained machine learning model(s) 136 may include updating parameters and/or weightings and/or thresholds utilized by the model(s) 136 based at least in part on the training dataset. Generation of the first trained machine learning model(s) 136 at block 602 may include using any suitable learning technique, such as supervised learning, unsupervised learning, semi-supervised learning, reinforcement learning, and so on.

At 604, the first trained machine learning model(s) 136 generated at block 602 is used (e.g., for face grouping) and retrained periodically. In some examples, the service computing platform 110 (e.g., a server computing device and/or a processor(s) thereof) may use and periodically retrain the first trained machine learning model(s) 136 at block 604. For instance, the service computing platform 110 may iteratively receive face image data 132 associated with users 102 and determine, based at least in part on the face image data 132 and using the first trained machine learning model(s) 136, N-dimensional representations of faces depicted in the face image data 132. The first trained machine learning model(s) 136 can be retrained based on a schedule, in response to events (e.g., in response to receiving feedback from human reviewers and/or electronic devices 104 of users 102 of the service 108, in response to receiving new/different face image data, etc.). In general, retraining the model(s) 136 periodically at block 604 may be aimed at improving the accuracy and/or efficiency of the model(s) 136.

At 606, an accuracy metric associated with the first trained machine learning model(s) 136 is determined. In some examples, the service computing platform 110 (e.g., a server computing device and/or a processor(s) thereof) may determine the accuracy metric at block 606. The accuracy metric can be any suitable metric, such as a false positive rate (e.g., a rate at which the first trained machine learning model(s) 136 groups a face of a first person/user with a face of a different person/user). In this example, a relatively low false positive rate may correlate to a high accuracy metric.

A false positive rate may be determined in any suitable manner, such as by receiving feedback from legitimate users of the service 102 who are being denied access to the service 108 and/or whose access to the service 108 is being interrupted and/or who are being notified of existing user accounts 118 and/or being prompted to login to those existing user accounts 118 even though the users did not create the existing users accounts 118. Additionally, or alternatively, authorized users may run tests using sample face image data to determine the accuracy metric.

At 608, a determination is made as to whether the accuracy metric satisfies a first (e.g., upper) threshold. In some examples, the service computing platform 110 (e.g., a server computing device and/or a processor(s) thereof) may determine whether the accuracy metric satisfies the first (e.g., upper) threshold at block 608. If the accuracy metric satisfies the first (e.g., upper) threshold, this may indicate that the first trained machine learning model(s) 136 is overperforming in terms of its face grouping accuracy. For example, a very low false positive rate or a false positive rate of zero, which may correlate to a very high accuracy metric or a maximum accuracy, may indicate that the first trained machine learning model(s) 136 is very good at grouping faces of the same user (as opposed to grouping faces of different users who look alike), but the overperformance of the first trained machine learning model(s) 136 may contribute to an increased consumption of computing resources to generate, process, and/or store the N-dimensional AI-generated face representations. Furthermore, latency may increase in terms of taking longer to group the N-dimensional AI-generated face representations together. Accordingly, if the accuracy metric satisfies the first (e.g., upper) threshold, the process 600 may follow the YES route from block 608 to block 610.

At 610, the first trained machine learning model(s) 136 is retrained to obtain a second trained machine learning model(s) 136 based at least in part on the accuracy metric (e.g., based at least in part on the accuracy metric satisfying the first (e.g., upper) threshold). In some examples, the service computing platform 110 (e.g., a server computing device and/or a processor(s) thereof) may retrain the first model(s) 136 at block 610. The retraining may be performed at block 610 to obtain a second trained machine learning model(s) 136 that is trained/retrained to generate P-dimensional representations of faces, P being less than N. In other words, the retraining performed at block 610 may be to reduce the dimensionality of the AI-generated face representations generated by the model(s) 136 in order to conserve computing resources and/or reduce latency.

For example, as indicated by the return arrow from block 610 to block 604, the retrained, second model(s) 136 can be used (e.g., for face grouping) with reduced computing resource consumption and/or reduced latency, as compared to using the first trained machine learning model(s) 136 prior to the retraining at block 610. For instance, the service computing platform 110 may iteratively receive face image data 132 associated with users 102 and determine, based at least in part on the face image data 132 and using the retrained, second model(s) 136, P-dimensional representations of faces depicted in the face image data 132, where P is less than N. This second trained machine learning model(s) 136 can be retrained at block 604 based on a schedule, in response to events, or the like, such as to improve the accuracy and/or efficiency of the second model(s) 136.

If, at block 608, the accuracy metric fails to satisfy the first (e.g., upper) threshold, the process 600 may follow the NO route from block 608 to block 612. At 612, a determination is made as to whether the accuracy metric fails to satisfy a second (e.g., lower) threshold. In some examples, the service computing platform 110 (e.g., a server computing device and/or a processor(s) thereof) may determine whether the accuracy metric fails to satisfy the second (e.g., lower) threshold at block 612. If the accuracy metric fails to satisfy the second (e.g., lower) threshold, this may indicate that the model(s) 136 is underperforming in terms of its face grouping accuracy. For example, a very high false positive rate or a maximum positive rate, which may correlate to a very low accuracy metric or a minimum accuracy, may indicate that the current model(s) 136 is very poor at grouping faces of the same user (e.g., the model(s) 136 may often group faces of different users who look alike). Accordingly, if the accuracy metric fails to satisfy the second (e.g., lower) threshold, the process 600 may follow the YES route from block 612 to block 614.

At 614, the current model(s) 136 is retrained to obtain a retrained model(s) 136 based at least in part on the accuracy metric (e.g., based at least in part on the accuracy metric failing to satisfy the second (e.g., lower) threshold). In some examples, the service computing platform 110 (e.g., a server computing device and/or a processor(s) thereof) may retrain the current model(s) 136 at block 614. The retraining may be performed at block 614 to obtain a retrained machine learning model(s) 136 that is trained/retrained to generate higher-dimensional representations of faces. For example, if N-dimensional face representations result in the model(s) 136 underperforming, the retraining at block 614 may be performed to obtain a model(s) 136 that is trained to generate Q-dimensional face representations, N being less than Q. In other words, the retraining performed at block 614 may be to increase the dimensionality of the AI-generated face representations generated by the model(s) 136 in order increase face grouping accuracy at a cost of increased computing resource consumption and/or increased latency.

For example, as indicated by the return arrow from block 614 to block 604, the retrained model(s) 136 can be used (e.g., for face grouping) with improved accuracy. If, at block 612, the accuracy metric satisfies the second (e.g., lower) threshold, the process 600 may follow the NO route from block 612 to block 604. In this manner, iteratively performing blocks 604 onward in the process 600 may allow reducing computing resource consumption and/or reducing latency without compromising face grouping accuracy.

Figure 7:
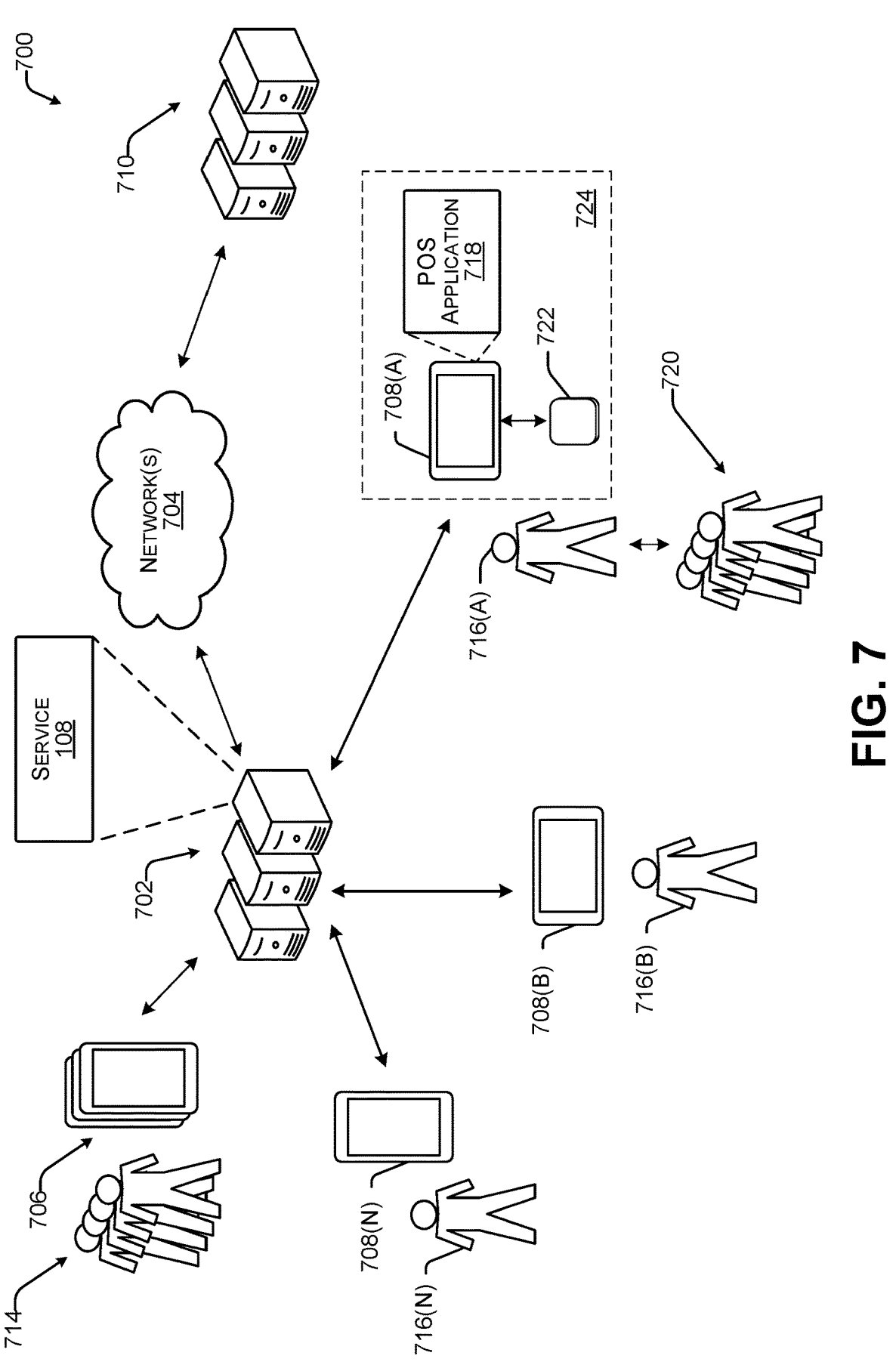
FIG. 7 is an example environment for performing techniques described herein.

FIG. 7 is an example environment 700 for performing techniques described herein. The environment 700 includes server(s) 702 that can communicate over a network 704 with user devices 706 (which, in some examples can be merchant devices 708 (individually, 708(A)-708(N))) and/or server(s) 710 associated with third-party service provider(s). The server(s) 702 can be associated with a service provider that can provide one or more services for the benefit of users 714, as described below. Actions attributed to the service provider can be performed by the server(s) 702.

For example, the server(s) 702 may be the same as or similar to the processing device(s) (e.g., server(s)) of the service computing platform 110 introduced in FIG. 1, and the server(s) 702 may implement the service 108 (e.g., a payment service), which may include the trained machine learning model(s) 136, the IDV component 138 and/or the user onboarding component 140, as described herein. Furthermore, the network(s) 704 may be the same as or similar to the network(s) 112 introduced in FIG. 1.

The environment 700 can include a plurality of user devices 706, as described above. Each one of the plurality of user devices 706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user devices 706 (and in some examples, the merchant devices 708) may be the same as or similar to the electronic devices 104 introduced in FIG. 1. In some examples, individual ones of the user devices can be operable by users 714. The users 714 can be referred to as customers, buyers, merchants, sellers, borrowers, employees, employers, payors, payees, couriers and so on. The users 714 can interact with the user devices 706 via user interfaces presented via the user devices 706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 706 can have an instance or versioned instance of an application, which can be downloaded from an application store, for example, which can present the user interface(s) described herein. In at least one example, a user 714 can interact with the user interface via touch input, spoken input, or any other type of input.

As described above, in at least one example, the users 714 can include merchants 716 (individually, 716(A)-716(N)). The users 714 (and in some examples, the merchants 716) may be the same as or similar to the users 102 introduced in FIG. 1. In an example, the merchants 716 can operate respective merchant devices 708, which can be user devices 706 configured for use by merchants 716. For the purpose of this discussion, a "merchant" can be any entity that offers items (e.g., goods or services) for purchase or other means of acquisition (e.g., rent, borrow, barter, etc.). The merchants 716 can offer items for purchase or other means of acquisition via brick-and-mortar stores, mobile stores (e.g., pop-up shops, food trucks, etc.), online stores, combinations of the foregoing, and so forth. In some examples, at least some of the merchants 716 can be associated with a same entity but can have different merchant locations and/or can have franchise/franchisee relationships. In additional or alternative examples, the merchants 716 can be different merchants. That is, in at least one example, the merchant 716(A) is a different merchant than the merchant 716(B) and/or the merchant 716(C).

In accordance with the examples described herein, the server(s) 702 may use face grouping for fraud reduction. For instance, the server(s) 702 may receive, in association with a request to access the service 108, image data 132 representing a face of a user 714 and additional data 134, determine, based at least in part on the image data 132 and using a trained machine learning model(s) 136, a representation 124(1) of the face, and determine one or more representations 124(2) to 124(N) of faces associated with the representation 124(1). The server(s) 702 can further determine first information 300(1) based at least in part on the additional data 134, determine second information 300(2) to 300(N) associated with the one or more representations 124(2) to 124(N), determine one or more differences between the first information 300(1) and the second information 300(2) to 300(N), and determine whether to accept or deny the request based at least in part on the determining of the one or more differences.

As another example, a merchant 716 may provide a service (e.g., a capital loan service, a buy now pay later loan service, a loyalty program, etc.). Accordingly, the merchant 716 may use the trained machine learning model(s) 122 for fraud reduction. For instance, the server(s) 702 may receive, from a user device of a customer 720 of the merchant 716, user data associated with a customer 720, determine a risk metric associated with the customer 720 based on the user data, and/or dynamically determine an incentive(s) 120 associated with the customer 720 based on the risk metric and/or the user data. The risk metric and/or the incentive(s) 120 may be determined using a trained machine learning model(s) 122 that is trained based on previously collected user data from one or more of the customers 720. The server(s) 702 can then cause a user interface to be displayed via a payment application executing on the user device of the customer 720, wherein the user interface presents an interactive element(s) for receiving the incentive(s) in exchange for the customer 720 referring at least one other customer 720 to the merchant's service.

As another example, service provider of a music, podcast and/or video streaming service ("streaming service") may use the trained machine learning model(s) 122 for fraud reduction. For instance, the server(s) 702 may receive, from a user device 706 of a user 714 (e.g., an artist, a streamer, etc.), user data associated with a user 714, determine a risk metric associated with the user 714 based on the user data, and/or dynamically determine an incentive(s) 120 associated with the user 714 based on the risk metric and/or the user data. The risk metric and/or the incentive(s) 120 may be determined using a trained machine learning model(s) 122 that is trained based on previously collected user data from one or more of the users 714 of the streaming service. The server(s) 702 can then cause a user interface to be displayed via a payment application executing on the user device 706 of the user 714, wherein the user interface presents an interactive element(s) for receiving the incentive(s) in exchange for the user 714 referring at least one other user (e.g., other artists, streamers, etc.) to the streaming service.

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 708 can have an instance of a POS application 718 stored thereon. In some examples, the POS application 718 may be the same as or similar to the application 106 introduced in FIG. 1. The POS application 718 can configure the merchant device 708 as a POS terminal, which enables the merchant 716(A) to interact with one or more customers 720. As described above, the users 714 can include customers, such as the customers 720 shown as interacting with the merchant 716(A). For the purpose of this discussion, a "customer" can be any entity that acquires items from merchants. While only two customers 720 are illustrated in FIG. 7, any number of customers 720 can interact with the merchants 716. Further, while FIG. 7 illustrates the customers 720 interacting with the merchant 716(A), the customers 720 can interact with any of the merchants 716.

In at least one example, interactions between the customers 720 and the merchants 716 that involve the exchange of funds (from the customers 720) for items (from the merchants 716) can be referred to as "transactions." In at least one example, the POS application 718 can determine transaction data associated with the POS transactions. Transaction data can include payment information, which can be obtained from a reader device 722 associated with the merchant device 708(A), user authentication data, purchase amount information, point-of-purchase information (e.g., item(s) purchased, date of purchase, time of purchase, etc.), etc. The POS application 718 can send transaction data to the server(s) 702 such that the server(s) 702 can track transactions of the customers 720, merchants 716, and/or any of the users 714 over time. Furthermore, the POS application 718 can present a UI to enable the merchant 716(A) to interact with the POS application 718 and/or the service provider via the POS application 718.

In at least one example, the merchant device 708(A) can be a special-purpose computing device configured as a POS terminal (via the execution of the POS application 718). In at least one example, the POS terminal may be connected to a reader device 722, which is capable of accepting a variety of payment instruments, such as credit cards, debit cards, gift cards, short-range communication based payment instruments, and the like, as described below. In at least one example, the reader device 722 can plug in to a port in the merchant device 708(A), such as a microphone port, a headphone port, an audio-jack, a data port, or other suitable port. In additional or alternative examples, the reader device 722 can be coupled to the merchant device 708(A) via another wired or wireless connection, such as via a Bluetooth®, BLE, and so on. Additional details are described below with reference to FIG. 10. In some examples, the reader device 722 can read information from alternative payment instruments including, but not limited to, wristbands and the like.

In some examples, the reader device 722 may physically interact with payment instruments such as magnetic stripe payment cards. EMV payment cards, and/or short-range communication (e.g., near field communication (NFC), radio frequency identification (RFID). Bluetooth®, Bluetooth® low energy (BLE), etc.) payment instruments (e.g., cards or devices configured for tapping). The POS terminal may provide a rich user interface, communicate with the reader device 722, and communicate with the server(s) 702, which can provide, among other services, a payment processing service. The server(s) 702 associated with the service provider can communicate with server(s) 710, as described below. In this manner, the POS terminal and reader device 722 may collectively process transaction(s) between the merchants 716 and customers 720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals. e.g., back-of-the-house systems, printers, line-buster devices. POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 722 of the POS system 724 are shown as separate devices, in additional or alternative examples, the POS terminal and the reader device 722 can be part of a single device. In some examples, the reader device 722 can have a display integrated therein for presenting information to the customers 720. In additional or alternative examples, the POS terminal can have a display integrated therein for presenting information to the customers 720. POS systems, such as the POS system 724, may be mobile, such that POS terminals and reader devices may process transactions in disparate locations across the world. POS systems can be used for processing card-present transactions and card-not-present (CNP) transactions, as described below.

A card-present transaction is a transaction where both a customer 720 and his or her payment instrument are physically present at the time of the transaction. Card-present transactions may be processed by swipes, dips, taps, or any other interaction between a physical payment instrument (e.g., a card), or otherwise present payment instrument, and a reader device 722 whereby the reader device 722 is able to obtain payment data from the payment instrument. A swipe is a card-present transaction where a customer 720 slides a card, or other payment instrument, having a magnetic strip through a reader device 722 that captures payment data contained in the magnetic strip. A dip is a card-present transaction where a customer 720 inserts a payment instrument having an embedded microchip (i.e., chip) into a reader device 722 first. The dipped payment instrument remains in the payment reader until the reader device 722 prompts the customer 720 to remove the card, or other payment instrument. While the payment instrument is in the reader device 722, the microchip can create a one-time code which is sent from the POS system 724 to the server(s) 710 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 720 may tap or hover his or her payment instrument (e.g., card, electronic device such as a smart phone running a payment application, etc.) over a reader device 722 to complete a transaction via short-range communication (e.g., NFC, RFID, Bluetooth®, BLE, etc.). Short-range communication enables the payment instrument to exchange information with the reader device 722. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 724, the server(s) 702, and/or the server(s) 710 may exchange payment information and transaction data to determine whether transactions are authorized. For example, the POS system 724 may provide encrypted payment data, user authentication data, purchase amount information, point-of-purchase information, etc. (collectively, transaction data) to server(s) 702 over the network(s)

704. The server(s) 702 may send the transaction data to the server(s) 710. As described above, in at least one example, the server(s) 710 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 710 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 710 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 710 associated therewith), and a payment authorization message is communicated from the issuer to the POS device via a path opposite of that described above, or via an alternate path.

As described above, the server(s) 710, which can be associated with payment service provider(s), may determine whether the transaction is authorized based on the transaction data, as well as information relating to parties to the transaction (e.g., the customer 720) and/or the merchant 716(A)). The server(s) 710 may send an authorization notification over the network(s) 704 to the server(s) 702, which may send the authorization notification to the POS system 724 over the network(s) 704 to indicate whether the transaction is authorized. The server(s) 702 may also transmit additional information such as transaction identifiers to the POS system 724. In one example, the server(s) 702 may include a merchant application and/or other functional components for communicating with the POS system 724 and/or the server(s) 710 to authorize or decline transactions.

Based on the authentication notification that is received by the POS system 724 from server(s) 702, the merchant 716(A) may indicate to the customer 720 whether the transaction has been approved. In some examples, approval may be indicated at the POS system 724, for example, at a display of the POS system 724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 714 can access all of the services of the service provider. In other examples, the users 714 can have gradated access to the services, which can be based on risk tolerance, IDV outputs, subscriptions, and so on. In at least one example, access to such services can be availed to the merchants 716 via the POS application 718. In additional or alternative examples, each service can be associated with its own access point (e.g., application, web browser, etc.).

The service provider can offer payment processing services for processing payments on behalf of the merchants 716, as described above. For example, the service provider can provision payment processing software, payment processing hardware and/or payment processing services to merchants 716, as described above, to enable the merchants 716 to receive payments from the customers 720 when conducting POS transactions with the customers 720. For instance, the service provider can enable the merchants 716 to receive cash payments, payment card payments, and/or electronic payments from customers 720 for POS transactions and the service provider can process transactions on behalf of the merchants 716.

As the service provider processes transactions on behalf of the merchants 716, the service provider can maintain accounts or balances for the merchants 716 in one or more ledgers. For example, the service provider can analyze transaction data received for a transaction to determine an amount of funds owed to a merchant 716(A) for the transaction. In at least one example, such an amount can be a total purchase price less fees charged by the service provider for providing the payment processing services. Based on determining the amount of funds owed to the merchant 716(A), the service provider can deposit funds into an account of the merchant 716(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 716(A) to a bank account of the merchant 716(A) that is held at a bank or other financial institution (e.g., associated with the server(s) 710). Scheduled deposits can occur at a prearranged time after a POS transaction is funded, which can be a business day after the POS transaction occurred, or sooner or later. In some examples, the merchant 716(A) can access funds prior to a scheduled deposit. For instance, the merchant 716(A) may have access to same-day deposits (e.g., wherein the service provider deposits funds from the stored balance to a linked bank account of the merchant on a same day as POS transaction, in some examples prior to the POS transaction being funded)

or instant deposits (e.g., wherein the service provider deposits funds from the stored balance to a linked bank account of the merchant on demand, such as responsive to a request). Further, in at least one example, the merchant 716(A) can have a payment instrument that is linked to the stored balance that enables the merchant to access the funds without first transferring the funds from the account managed by the service provider to the bank account of the merchant 716(A).

In at least one example, the service provider may provide inventory management services. That is, the service provider may provide inventory tracking and reporting. Inventory management services may enable the merchant 716(A) to access and manage a database storing data associated with a quantity of each item that the merchant 716(A) has available (i.e., an inventory). Furthermore, in at least one example, the service provider can provide catalog management services to enable the merchant 716(A) to maintain a catalog, which can be a database storing data associated with items that the merchant 716(A) has available for acquisition (i.e., catalog management services). In at least one example, the catalog may include a plurality of data items and a data item of the plurality of data items may represent an item that the merchant 716(A) has available for acquisition. The service provider can offer recommendations related to pricing of the items, placement of items on the catalog, and multi-party fulfilment of the inventory.

In at least one example, the service provider can provide business banking services, which allow the merchant 716(A) to track deposits (from payment processing and/or other sources of funds) into an account of the merchant 716(A), payroll payments from the account (e.g., payments to employees of the merchant 716(A)), payments to other merchants (e.g., business-to-business) directly from the account or from a linked debit card, withdrawals made via scheduled deposit and/or instant deposit, etc. Furthermore, the business banking services can enable the merchant 716(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 716 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 716. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 714 who are unfamiliar with HTML, XML, Javascript, CSS, or other web design tools to create and maintain a professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 716. In at least one example, the service provider can recommend and/or generate content items to supplement omni-channel presences of the merchants 716. That is, if a merchant of the merchants 716 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 714 to set schedules for scheduling appointments and/or users 714 to schedule appointments.

In some examples, the service provider can provide restaurant management services to enable users 714 to make and/or manage reservations, to monitor front-of-house and/or back-of-house operations, and so on. In such examples, the merchant device(s) 708 and/or server(s) 702 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 714 who can travel between locations to perform services for a requesting user 714 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 706.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 714, voice inputs into a virtual assistant or the like, to determine intents of user(s) 714. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 714 may be new to the service provider such that the user 714 that has not registered (e.g., subscribed to receive access to one or more services offered by the service provider) with the service provider. The service provider can offer onboarding services for registering a potential user 714 with the service provider. In some examples, onboarding can involve presenting various questions, prompts, and the like to a potential user 714 to obtain information that can be used to generate a profile for the potential user 714. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 714 providing all necessary information, the potential user 714 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 710). That is, the service provider can offer IDV services to verify the identity of users 714 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 714 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 710 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 702) and/or server(s) 710 via the network(s) 704. In some examples, the merchant device(s) 708 are not capable of connecting with the service provider (e.g., the server(s) 702) and/or the server(s) 710, due to a network connectivity issue, for example. In additional or alternative examples, the server(s) 702 are not capable of communicating with the server(s) 710 due to network connectivity issue, for example. In such examples, devices may operate in "offline" mode where at least some payment data is stored (e.g., on the merchant device(s) 708) and/or the server(s) 702 until connectivity is restored and the payment data can be transmitted to the server(s) 702 and/or the server(s) 710 for processing.

In at least one example, the service provider can be associated with a hub, such as an order hub, an inventory hub, a fulfillment hub and so on, which can enable integration with one or more additional service providers (e.g., associated with the additional server(s) 710). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 706 that are in communication with one or more server computing devices 702 of the service provider. That is, techniques described herein are directed to a specific implementation—or, a practical application—of utilizing a distributed system of user devices 706 that are in communication with one or more server computing devices 702 of the service provider to perform a variety of services, as described above. The unconventional configuration of the distributed system described herein enables the server(s) 702 that are remotely-located from end-users (e.g., users 714) to intelligently offer services based on aggregated data associated with the end-users, such as the users 714 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 714 and user devices 706. Furthermore, such features are changed dynamically based on the profiles of the users involved interacting with the GUIs. As such, techniques described herein are directed to improvements to computing systems.

Figure 8:
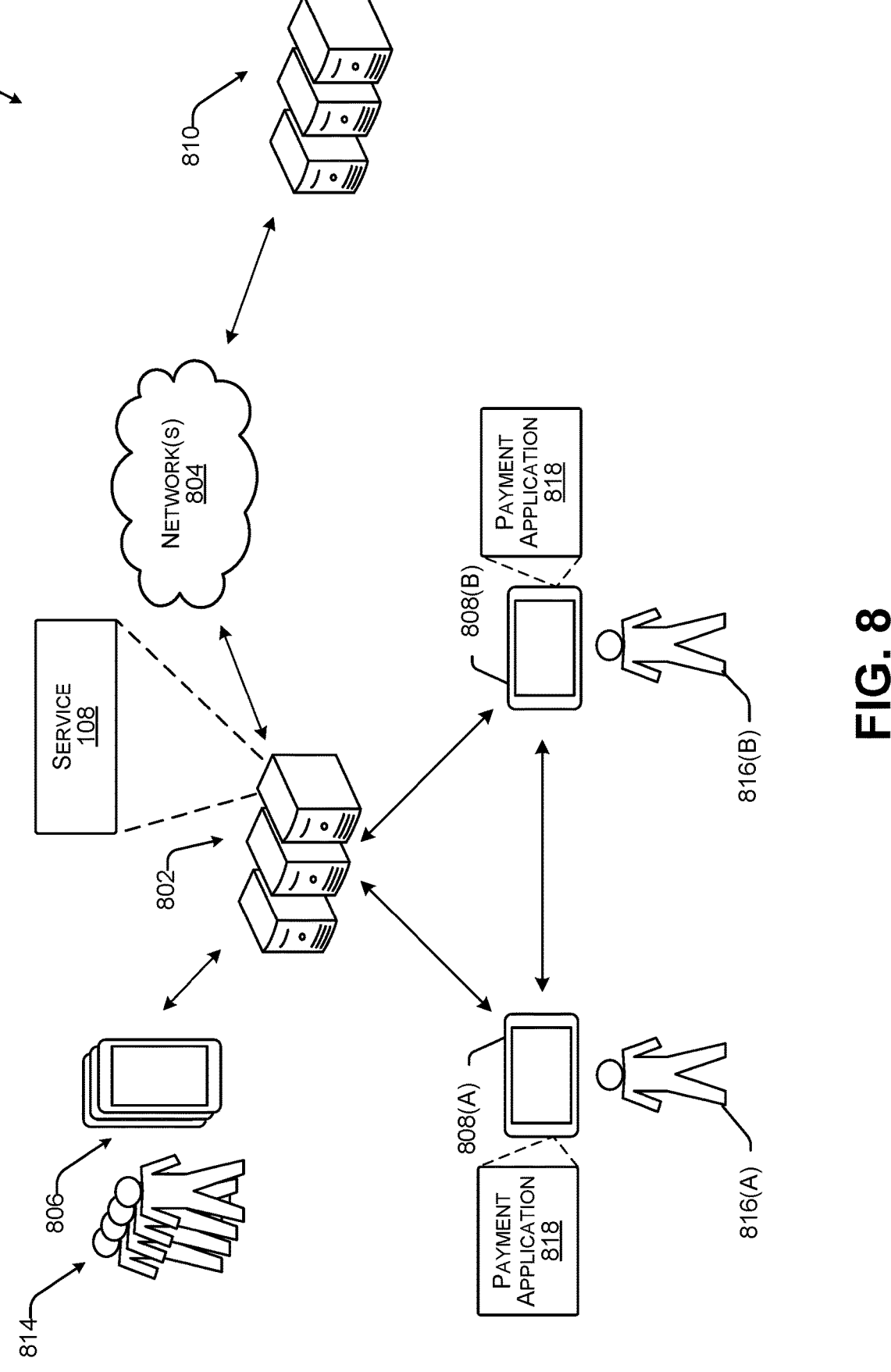
FIG. 8 is an example environment for performing techniques described herein.

FIG. 8 is an example environment 800 for performing techniques described herein. The environment 800 includes server(s) 802 that can communicate over a network 804 with user devices 806 (which, in some examples can be user devices 808 (individually, 808(A), 808(B)) and/or server(s) 810 associated with third-party service provider(s). The server(s) 802 can be associated with a service provider that can provide one or more services for the benefit of users 814, as described below. Actions attributed to the service provider can be performed by the server(s) 802. In some examples, the service provider referenced in FIG. 7 can be the same or different than the service provider referenced in FIG. 8.

For example, the server(s) 802 may be the same as or similar to the processing device(s) (e.g., server(s)) of the payment service computing platform 110 introduced in FIG. 1, and the server(s) 802 may implement the service 108 (e.g., a payment service), which may include the trained machine learning model(s) 136, the IDV component 138 and/or the user onboarding component 140, as described herein. Furthermore, the network(s) 804 may be the same as or similar to the network(s) 112 introduced in FIG. 1.

The environment 800 can include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user devices 806 (and in some examples, the user devices 808) may be the same as or similar to the electronic devices 104 introduced in FIG. 1. In some examples, individual ones of the user devices can be operable by users 814. The users 814 can be referred to as customers, buyers, merchants, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

In at least one example, the service provider can provide a peer-to-peer payment service that enables peer-to-peer payments between two or more users 814. Two users, user 816(A) and user 816(B) are illustrated in FIG. 8 as "peers" in a peer-to-peer payment. In at least one example, the service provider can communicate with instances of a payment application 818 (or other access point) installed on devices 806 configured for operation by users 814. In an example, an instance of the payment application 818 executing on a first device 808(A) operated by a payor (e.g., user 816(A)) can send a request to the service provider to transfer an asset (e.g., fiat currency, non-fiat currency, cryptocurrency, securities, gift cards, and/or related assets) from the payor to a payee (e.g., user 816(B)) via a peer-to-peer payment. In some examples, assets associated with an account of the payor are transferred to an account of the payee. In some examples, assets can be held at least temporarily in an account of the service provider prior to transferring the assets to the account of the payee. The users 814 (and in some examples, the users 816) may be the same as or similar to the users 102 introduced in FIG. 1, and the payment application 818 may be the same as or similar to the application 106 introduced in FIG. 1.

In accordance with the examples described herein, the server(s) 802 may use face grouping for fraud reduction. For instance, the server(s) 802 may receive, in association with a request to access the service 108, image data 132 representing a face of a user 814, 816 and additional data 134, determine, based at least in part on the image data 132 and using a trained machine learning model(s) 136, a representation 124(1) of the face, and determine one or more representations 124(2) to 124(N) of faces associated with the representation 124(1). The server(s) 802 can further determine first information 300(1) based at least in part on the additional data 134, determine second information 300(2) to 300(N) associated with the one or more representations 124(2) to 124(N), determine one or more differences between the first information 300(1) and the second information 300(2) to 300(N), and determine whether to accept or deny the request based at least in part on the determining of the one or more differences.

In some examples, the service provider can utilize a ledger system to track transfers of assets between users 806. FIG. 9, below, provides additional details associated with such a ledger system. The ledger system can enable users 806 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 818 executing on user device(s) of payee(s). As an example, the service provider can transfer assets from an account of user 816(A) to an account of the user 816(B) and can send a notification to the user device 808(B) of the user 816(B) for presentation via a user interface. The notification can indicate that a transfer is in process, a transfer is complete, or the like. In some examples, the service provider can send additional or alternative information to the instances of the payment application 818 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 818 executing on the user devices 806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 8 or a third-party service provider associated with the server(s) 810. In examples where the content provider is a third-party service provider, the server(s) 810 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 8. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 806 (e.g., mobile device or conventional personal computer (PC)) based on instructions transmitted to and from the server(s) 802 (which, in such an example can be called a "messaging server"). In some instances, the messaging application can include a payment application with messaging capability that enables users of the payment application to communicate with one another. In such instances, the payment application can be executed on a user device 806 based on instructions transmitted to and from the server(s) 802 (e.g., the payment service discussed in this description or another payment service that supports payment transactions). In some examples, the messaging application can be provided by a third-party service provider associated with the server(s) 810. In examples where the messaging application is a third-party service provider, the server(s) 810 can be accessible via one or more APIs or other integrations.

As described above, the service provider can facilitate peer-to-peer transactions, which can enable users 806 to transfer fiat currency, non-fiat currency, cryptocurrency, securities, or other assets, or portions thereof, to other users 806. In at least one example, individual users can be associated with user accounts. Additional details associated with user accounts and the transfer of assets between users 806 are described below with reference to FIG. 9.

Furthermore, the service provider of FIG. 8 can enable users 806 to perform banking transactions via instances of the payment application 818. For example, users can configure direct deposits or other deposits for adding assets to their various ledgers/balances. Further, users 806 can configure bill pay, recurring payments, and/or the like using assets associated with their accounts. In addition to sending and/or receiving assets via peer-to-peer transactions, users 806 buy and/or sell assets via asset networks such as cryptocurrency networks, securities networks, and/or the like.

FIG. 9 is an example data store 900 used for performing techniques described herein. The data store(s) 900 can be associated with the server(s) 802. The data store(s) 900 may be the same as or similar to the data store(s) 114 introduced in FIG. 1.

In at least one example, the data store(s) 900 can store assets in an asset storage 902, as well as data in user account(s) 904, merchant account(s) 906, and/or customer account(s) 908. In at least one example, the asset storage 902 can be used to store assets managed by the service provider of FIG. 8. In at least one example, the asset storage 902 can be used to record whether individual of the assets are registered to users. For example, the asset storage 902 can include an asset wallet 910 for storing records of assets owned by the service provider of FIG. 8, such as crypto-currency, securities, or the like, and communicating with one or more asset networks, such as cryptocurrency networks, securities networks, or the like. In some examples, the asset network can be a first-party network or a third-party net-work, such as a cryptocurrency exchange or the stock market. In examples where the asset network is a third-party network, the server(s) 810 can be associated therewith. In some examples, the asset wallet 910 can communication with the asset network via one or more components asso-ciated with the server(s) 802.

The asset wallet 910 can be associated with one or more addresses and can vary addresses used to acquire assets (e.g., from the asset network(s)) so that its holdings are repre-sented under a variety of addresses on the asset network. In examples where the service provider of FIG. 8 has its own holdings of cryptocurrency (e.g., in the asset wallet 910), a user can acquire cryptocurrency directly from the service provider of FIG. 8. In some examples, the service provider of FIG. 8 can include logic for buying and selling crypto-currency to maintain a desired level of cryptocurrency. In some examples, the desired level can be based on a volume of transactions over a period of time, balances of collective cryptocurrency ledgers, exchange rates, or trends in chang-ing of exchange rates such that the cryptocurrency is trend-ing towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 902 may contain ledgers that store records of assignments of assets to users 814. Specifically, the asset storage 902 may include asset ledger 910, fiat currency ledger 914, and other ledger(s) 916, which can be used to record transfers of assets between users 814 of the service provider and/or one or more third-parties (e.g., merchant network(s), payment card network(s), ACH net-work(s), equities network(s), the asset network, securities networks, etc.). In doing so, the asset storage 902 can maintain a running balance of assets managed by the service provider of FIG. 8. The ledger(s) of the asset storage 902 can further indicate some of the running balance for each of the ledger(s) stored in the asset storage 902 is assigned or registered to one or more user account(s) 904.

In at least one example, the asset storage 902 can include transaction logs 918, which can include records of past transactions involving the service provider of FIG. 8. In at least one example, transaction data, as described herein, can be stored in association with the transaction logs 918.

In some examples, the data store(s) 900 can store a private blockchain 919. A private blockchain 919 can function to record sender addresses, recipient addresses, public keys, values of cryptocurrency transferred, and/or can be used to verify ownership of cryptocurrency tokens to be transferred.

In some examples, the service provider of FIG. 8 can record transactions taking place within the service provider of FIG. 8 involving cryptocurrency until the number of transactions has exceeded a determined limit (e.g., number of transac-tions, storage space allocation, etc.). Based at least in part on determining that the limit has been reached, the service provider of FIG. 8 can publish the transactions in the private blockchain 919 to a public blockchain (e.g., associated with the asset network), where miners can verify the transactions and record the transactions to blocks on the public block-chain. In at least one example, the service provider of FIG. 8 can participate as miner(s) at least for its transactions to be posted to the public blockchain.

In at least one example, the data store(s) 900 can store and/or manage accounts, such as user account(s) 904, mer-chant account(s) 906, and/or customer account(s) 908. In at least one example, the user account(s) 904 may store records of user accounts associated with the users 814. In at least one example, the user account(s) 904 can include a user account 920, which can be associated with a user (of the users 814). Other user accounts of the user account(s) 904 can be similarly structured to the user account 920, according to some examples. In other examples, other user accounts may include more or less data and/or account information than that provided by the user account 920. In at least one example, the user account 9) 20 can include user account data 928, which can include, but is not limited to, data associated with user identifying information (e.g., name, phone number, address, etc.), user identifier(s) (e.g., alpha-numeric identifiers, etc.), user preferences (e.g., learned or user-specified), purchase history data (e.g., identifying one or more items purchased (and respective item information), linked payment sources (e.g., bank account(s), stored bal-ance(s), etc.), payment instruments used to purchase one or more items, returns associated with one or more orders, statuses of one or more orders (e.g., preparing, packaging, in transit, delivered, etc.), etc.), appointments data (e.g., pre-vious appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inven-tory data, user service data, loyalty data (e.g., loyalty account numbers, rewards redeemed, rewards available, etc.), risk indicator(s) (e.g., level(s) of risk), etc.

In at least one example, the user account data 928 can include account activity 930 and user wallet key(s) 932. The account activity 930 may include a transaction log for recording transactions associated with the user account 920. In some examples, the user wallet key(s) 932 can include a public-private key-pair and a respective address associated with the asset network or other asset networks. In some examples, the user wallet key(s) 932 may include one or more key pairs, which can be unique to the asset network or other asset networks.

In addition to the user account data 928, the user account 920 can include ledger(s) for account(s) managed by the service provider of FIG. 8, for the user. For example, the user account 920 may include an asset ledger 934, a fiat currency ledger 936, and/or one or more other ledgers 938. The ledger(s) can indicate that a corresponding user utilizes the service provider of FIG. 8 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 8.

In some examples, the asset ledger 934 can store a balance for each of one or more cryptocurrencies (e.g., Bitcoin, Ethereum, Litecoin, etc.) registered to the user account 920. In at least one example, the asset ledger 934 can further record transactions of cryptocurrency assets associated with the user account 920. For example, the user account 920 can receive cryptocurrency from the asset network using the user wallet key(s) 932. In some examples, the user wallet key(s) 932 may be generated for the user upon request. User wallet key(s) 932 can be requested by the user in order to send, exchange, or otherwise control the balance of cryptocurrency held by the service provider of FIG. 8 (e.g., in the asset wallet 910) and registered to the user. In some examples, the user wallet key(s) 932 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 8 and the value is credited as a balance in asset ledger 934), by purchasing currency in the form associated with the account using currency in a different form (e.g., buying a value of cryptocurrency from the service provider of FIG. 8 using a value of fiat currency reflected in fiat currency ledger, and crediting the value of cryptocurrency in asset ledger 934), or by conducting a transaction with another user (customer or merchant) of the service provider of FIG. 8 wherein the account receives incoming currency (which can be in the form associated with the account or a different form, in which the incoming currency may be converted to the form associated with the account). In some examples, the user account data 928 can include preferences for maintaining balances of individual of the ledgers. For example, the service provider of FIG. 8 can automatically debit the fiat currency ledger 936 to increase the asset ledger 934, or another account associated with the user whenever the cryptocurrency balance (e.g., of the asset ledger 934) falls below a stated level (e.g., a threshold). Conversely, in some embodiments, the service provider of FIG. 8 can automatically credit the fiat currency ledger 936 to decrease the asset ledger 934 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 810) unrelated to the service provider of FIG. 8 (i.e., an external account). In at least one example, the user can transfer all or a portion of a balance of the cryptocurrency stored in the third-party cryptocurrency wallet to the service provider of FIG. 8. Such a transaction can require the user to transfer an amount of the cryptocurrency in a message signed by user's private key to an address provided by the service provider of FIG. 8. In at least one example, the transaction can be sent to miners to bundle the transaction into a block of transactions and to verify the authenticity of the transactions in the block. Once a miner has verified the block, the block is written to a public, distributed blockchain where the service provider of FIG. 8 can then verify that the transaction has been confirmed and can credit the user's asset ledger 934 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 8. As described above, in some examples, the service provider of FIG. 8 can acquire cryptocurrency from a third-party source (e.g., associated with the third-party server(s) 118). In such examples, the asset wallet 910 can be associated with different addresses and can vary addresses used to acquire cryptocurrency so that its holdings are represented under a variety of addresses on a blockchain. When the service provider of FIG. 8 has their own holdings of cryptocurrency, users can acquire cryptocurrency directly from the service provider of FIG. 8. In some examples, the service provider of FIG. 8 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 8 has its own cryptocurrency assets, cryptocurrency transferred in a transaction (e.g., data with address provided for receipt of transaction and a balance of cryptocurrency transferred in the transaction) can be stored in the asset wallet 910. In at least one example, the service provider of FIG. 8 can credit the asset ledger 934 of the user. Additionally, while the service provider of FIG. 8 recognizes that the user retains the value of the transferred cryptocurrency through crediting the asset ledger 934, any person that inspects the blockchain will see the cryptocurrency as having been transferred to the service provider of FIG. 8. In some examples, the asset wallet 910 can be associated with many different addresses. In such examples, any person that inspects the blockchain may not easily associate all cryptocurrency stored in asset wallet 910 as belonging to the same entity. It is this presence of a private ledger that is used for real-time transactions and maintained by the service provider of FIG. 8, combined with updates to the public ledger at other times, that allows for extremely fast transactions using cryptocurrency to be achieved. In some examples, the "private ledger" can refer to the asset ledger 910, which in some examples, can utilize the private blockchain 919, as described herein. The "public ledger" can correspond to a public blockchain associated with the asset network.

In at least one example, a user's asset ledger 934, fiat currency ledger 936, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 934. In some examples, a user can receive fiat currency or another currency in the form of payment for a transaction with another user. In at least one example, at least a portion of such funds can be converted into crypto-currency by the service provider of FIG. 8 and used to fund the asset ledger 934 of the user.

As addressed above, in some examples, users can also have other accounts maintained by the service provider of FIG. 8. For example, a user can also have an account in U.S. dollars, which can be tracked, for example, via the fiat currency ledger 936. Such an account can be funded by transferring money from a bank account at a third-party bank to an account maintained by the service provider of FIG. 8 as is conventionally known. In some examples, a user can receive fiat currency in the form of payment for a transaction with another user. In such examples, at least a portion of such funds can be used to fund the fiat currency ledger 936.

In some examples, a user can have one or more internal payment cards registered with the service provider of FIG. 8. Internal payment cards can be linked to one or more of the accounts associated with the user account 920. In some embodiments, options with respect to internal payment cards can be adjusted and managed using an application (e.g., the payment application 818).

In at least one example, as described above, each ledger can correspond to an account of the user that is managed by the service provider of FIG. 8. In at least one example, individual of the accounts can be associated with a wallet or a stored balance for use in payment transactions, peer-to-peer transactions, payroll payments, etc.

In at least one example, the user account 920 can be associated with an asset wallet 940. The asset wallet 940 of the user can be associated with account information that can be stored in the user account data 928 and, in some examples, can be associated with the user wallet key(s) 932. In at least one example, the asset wallet 940 can store data indicating an address provided for receipt of a cryptocur-rency transaction. In at least one example, the balance of the asset wallet 940 can be based at least in part on a balance of the asset ledger 934. In at least one example, funds availed via the asset wallet 940 can be stored in the asset wallet 940 or the asset wallet 910. Funds availed via the asset wallet 910 can be tracked via the asset ledger 934. The asset wallet 940, however, can be associated with additional cryptocur-rency funds.

In at least one example, when the service provider of FIG. 8 includes a private blockchain 919 for recording and validating cryptocurrency transactions, the asset wallet 940 can be used instead of, or in addition to, the asset ledger 934. For example, at least one example, a merchant can provide the address of the asset wallet 940 for receiving payments. In an example where a customer is paying in cryptocurrency and the customer has their own cryptocurrency wallet account associated with the service provider of FIG. 8, the customer can send a message signed by its private key including its wallet address (i.e., of the customer) and identifying the cryptocurrency and value to be transferred to the merchant's asset wallet 940. The service provider of FIG. 8 can complete the transaction by reducing the cryp-tocurrency balance in the customer's cryptocurrency wallet and increasing the cryptocurrency balance in the merchant's asset wallet 940. In addition to recording the transaction in the respective cryptocurrency wallets, the transaction can be recorded in the private blockchain 919 and the transaction can be confirmed. A user can perform a similar transaction with cryptocurrency in a peer-to-peer transaction as described above. In at least one example, the cryptocurrency wallet account 930 can be funded by a balance transfer from a third-party cryptocurrency wallet, as described above. Such a transaction can require a user to transfer an amount of cryptocurrency in a message signed by the user's private key to an address of the cryptocurrency wallet account 930. The transferred amount of cryptocurrency can then be within the cryptocurrency wallet account 930 for use in later transactions.

While the asset ledger 934 and/or asset wallet 940 are each described above with reference to cryptocurrency, the asset ledger 934 and/or asset wallet 940 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 8 is an aspect of the technology disclosed that enables technical advantages of increased processing speed and improved security.

Figure 10:
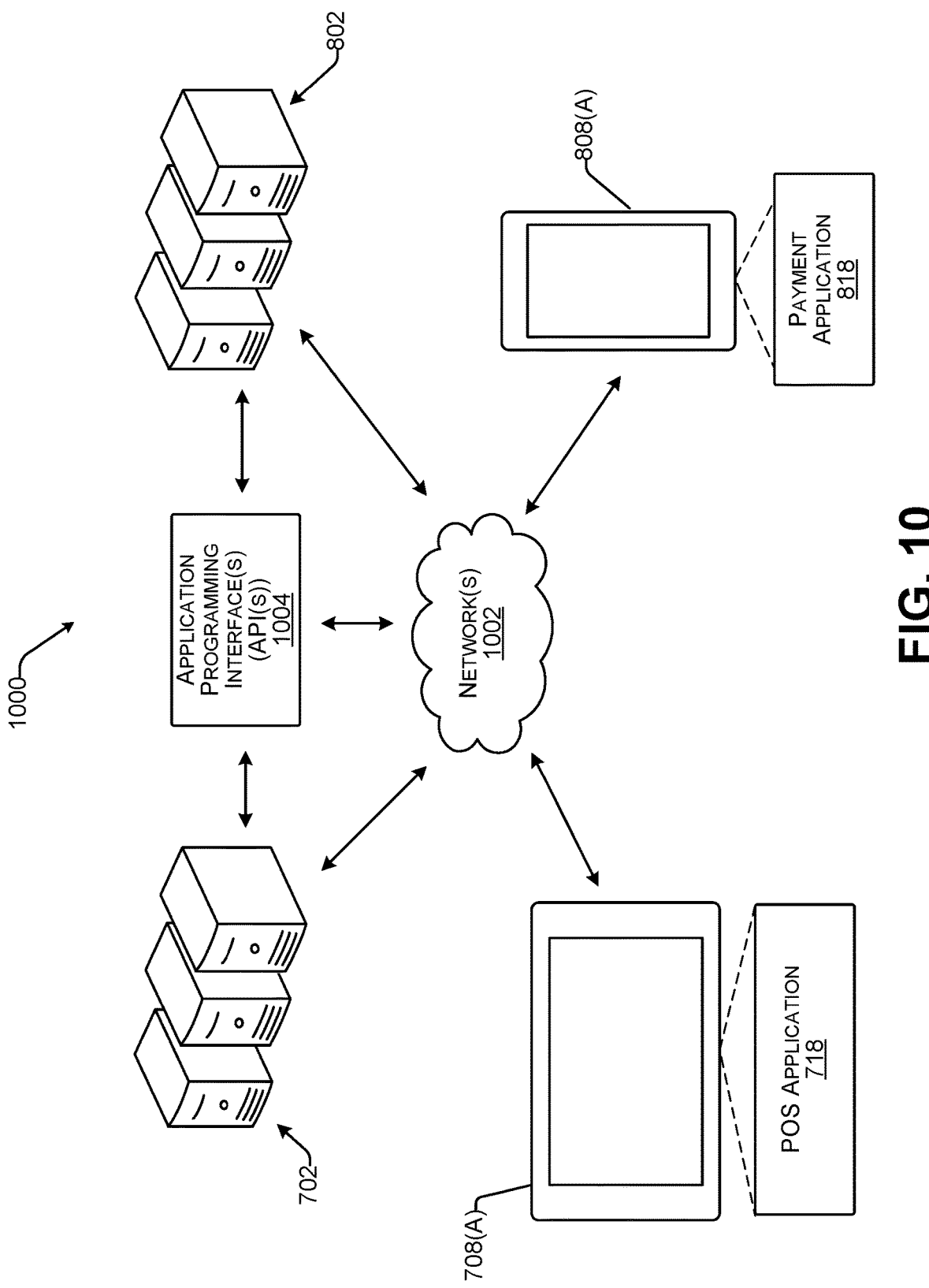
FIG. 10 is an example environment for performing techniques described herein.

FIG. 10 is an example environment 1000 for performing techniques described herein. In the environment 1000, the environment 700 and the environment 800 can be integrated to enable payments at the point-of-sale using assets associ-ated with user accounts in the peer-to-peer environment of FIG. 8. As illustrated, each of the components can commu-nicate with one another via one or more networks 1002. In some examples, one or more APIs 1004 or other functional components can be used to facilitate such communication.

In at least one example, the example environment 1000 can enable contactless payments, via integration of peer-to-peer payment, or other payment making, platform(s) and payment processing platform(s), are described herein. For the purpose of FIG. 10, the environment 700 can refer to a payment processing platform and the environment 800 can refer to a peer-to-peer payment, or payment making, plat-form. In an example, such an integration can enable a customer to participate in a transaction via their own com-puting device instead of interacting with a merchant device of a merchant, such as the merchant device 708(A). In such an example, the POS application 718, associated with a payment processing platform and executable by the mer-chant device 708(A) of the merchant, can present a QR code, or other code that can be used to identify a transaction (e.g., a transaction code), in association with a transaction between the customer and the merchant. The QR code, or other transaction code, can be provided to the POS appli-cation 718 via an API associated with the peer-to-peer payment platform. In an example, the customer can utilize their own computing device, such as the user device 808(A), to capture the QR code, or the other transaction code, and to provide an indication of the captured QR code, or other transaction code, to server(s) 702 and/or server(s) 802.

Based at least in part on the integration of the peer-to-peer payment platform and the payment processing platform (e.g., via the API), the server(s) 702 and/or 802 associated with each can exchange communications with each other— and with a payment application 818 associated with the peer-to-peer payment platform and/or the POS application 718—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 808(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 718 and the payment application 818, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 718, associated with a payment processing platform, on the merchant device 708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 708(A) can present a QR code, or other transaction code, that can be associated with a peer-to-peer payment platform. The customer can use a camera associated with the user device 808(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 718, associated with a payment processing platform, on the merchant device 708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 718 can cause a text message with a resource locator (e.g., uniform resource locator (URL)) that can be associated with a peer-to-peer payment platform to be sent to the user device 808(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 808(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 718 of a merchant device 708(A) at a brick-and-mortar store of a merchant to a payment application 818 of a user device 808(A) of a customer to enable the customer to participate in a transaction via their own computing device. For instance, in a "scan to pay" example as described above, based at least in part on capturing the QR code, or other transaction code, via the user device 808(A), the payment processing platform can provide transaction data to the peer-to-peer payment platform for presentation via the payment application 818 on the user device 808(A). In some examples, the customer can watch items being added to their cart (e.g., via a user interface presented via the payment application). As an item is added to a virtual cart by the merchant—via the POS application 718 on the merchant device 708(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 818 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 808(A) during or after payment of the transaction.

In some examples, based at least in part on capturing the QR code, or other transaction code, the payment processing platform can provide transaction data to the peer-to-peer payment platform for presentation via the payment application 818 on the computing device of the customer, such as the user device 808(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 818 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below-techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 718, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera or other sensor, used to capture a QR code, or other transaction code, is integrated into a payment application 818 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 11:
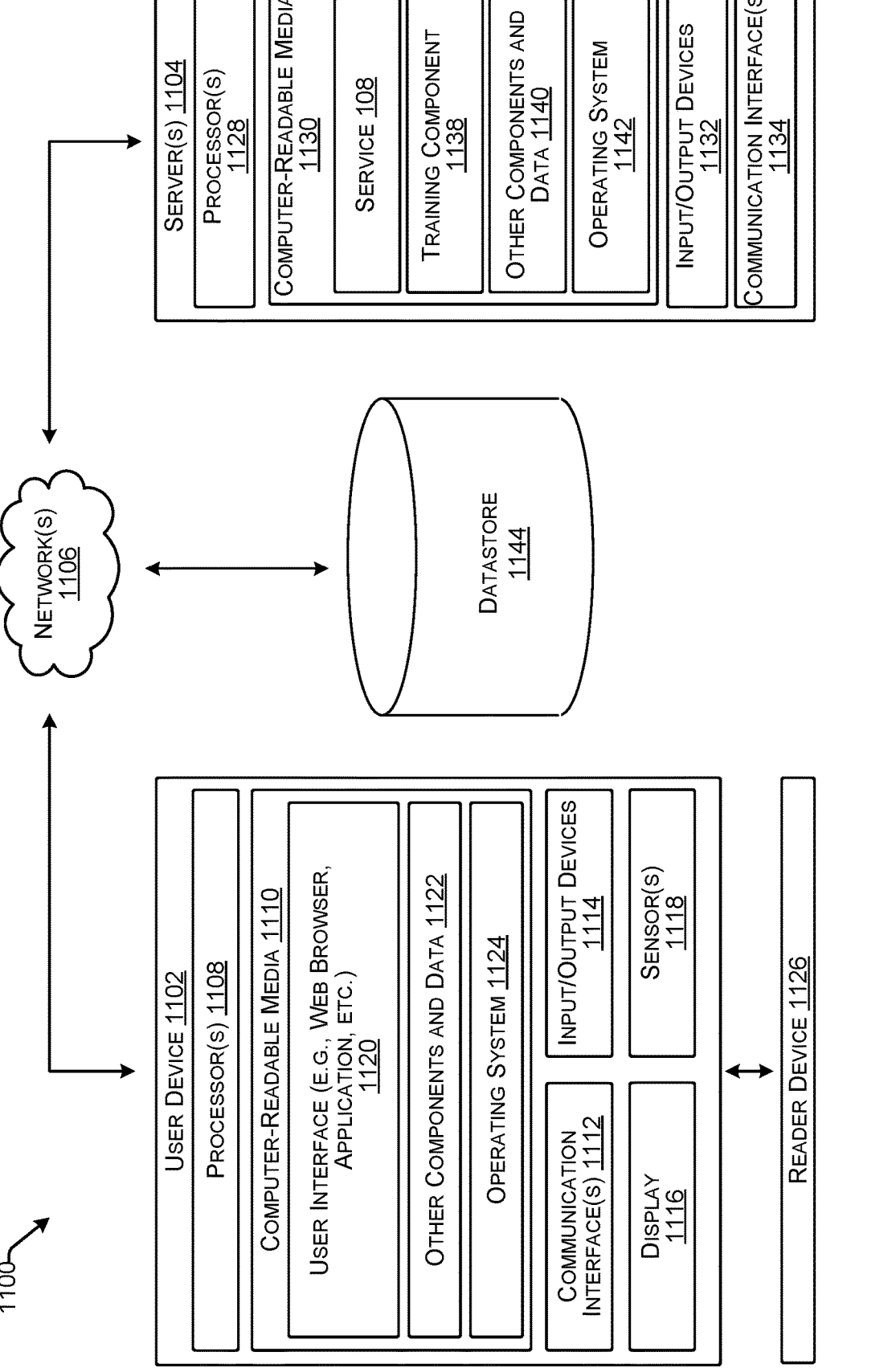
FIG. 11 is an example block diagram illustrating a system for performing techniques described herein.

FIG. 11 is an example block diagram 1100 illustrating a system for performing techniques described herein. The block diagram 1100 illustrates a system 1100 for performing techniques described herein. The system 1100 includes a user device 1102, that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 7.

For example, the server(s) 1104 may be the same as or similar to the payment service computing platform 110 and/or the processing device(s) (e.g., server(s)) of the service computing platform 110 introduced in FIG. 1, and the server(s) 1104 may implement the service 108 (e.g., a payment service), which may include the trained machine learning model(s) 136, the IDV component 138, and/or the user onboarding component 140, as described herein. Furthermore, the network(s) 1106 may be the same as or similar to the network(s) 112 introduced in FIG. 1, and the user device 1102 may be the same as or similar to the electronic device 104 introduced in FIG. 1.

In at least one example, the user device 1102 can be any suitable type of computing device, e.g., portable, semi-portable, semi-stationary, or stationary. Some examples of the user device 1102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1102 can be any computing device capable of sending communications and performing the functions according to the techniques described herein. The user device 1102 can include devices, e.g., payment card readers, or components capable of accepting payments, as described below.

In the illustrated example, the user device 1102 includes one or more processors 1108, one or more computer-readable media 1110, one or more communication interface(s) 1112, one or more input/output (I/O) devices 1114, a display 1116, and sensor(s) 1118.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, and/or any devices that manipulate signals based on operational instructions. In some examples, the processor(s) 1108 can be one or more hardware processors and/or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1110 can include, but is not limited to, RAM, ROM, EEPROM, flash memory, solid-state storage, magnetic disk storage, optical storage, and/or other computer-readable media technology. Further, in some examples, the user device 1102 can access external storage, such as RAID storage systems, storage arrays, network attached storage, storage area networks, cloud storage, or any other medium that can be used to store information and that can be accessed by the processor(s) 1108 directly or through another computing device or network. Accordingly, the computer-readable media 1110 can be computer storage media able to store instructions, components or components that can be executed by the processor(s) 1108. Further, when mentioned, non-transitory computer-readable media exclude media such as energy, carrier signals, electromagnetic waves, and signals per se.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 can include a user interface 1120 to enable users to interact with the user device 1102, and thus the server(s) 1104 and/or other networked devices. In at least one example, the user interface 1120 can be presented via a web browser, or the like. In other examples, the user interface 1120 can be presented via an application, such as a mobile application or desktop application, which can be provided by a service provider associated with the server(s) 1104, or which can be an otherwise dedicated application. In some examples, the user interface 1120 can be any of the user interfaces 118. 400, and/or 402 described herein. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, to determine context or intent of the user, which may be treated in a manner similar to "direct" user input.

In accordance with the examples described herein, the server(s) 1104 may use face grouping for fraud reduction. For instance, the server(s) 1104 may receive (e.g., from the user device 1102), in association with a request to access the service 108, image data 132 representing a face of a user and additional data 134, determine, based at least in part on the image data 132 and using a trained machine learning model(s) 136, a representation 124(1) of the face, and determine one or more representations 124(2) to 124(N) of faces associated with the representation 124(1). The server(s) 1104 can further determine first information 300(1) based at least in part on the additional data 134, determine second information 300(2) to 300(N) associated with the one or more representations 124(2) to 124(N), determine one or more differences between the first information 300(1) and the second information 300(2) to 300(N), and determine whether to accept or deny the request based at least in part on the determining of the one or more differences.

Depending on the type of the user device 1102, the computer-readable media 1110 can also optionally include other functional components and data, such as other components and data 1122, which can include programs, drivers, etc., and the data used or generated by the functional components. In addition, the computer-readable media 1110 can also store data, data structures and the like, that are used by the functional components. Further, the user device 1102 can include many other logical, programmatic and physical components, of which those described are merely examples that are related to the discussion herein.

In at least one example, the computer-readable media 1110 can include additional functional components, such as an operating system 1124 for controlling and managing various functions of the user device 1102 and for enabling basic user interactions.

The communication interface(s) 1112 can include one or more interfaces and hardware components for enabling communication with various other devices, such as over the network(s) 1106 or directly. For example, communication interface(s) 1112 can enable communication through one or more network(s) 1106, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 can include speakers, a microphone, a camera, and various user controls (e.g., buttons, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 can include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital content thereon. In at least one example, the display 1116 can be an augmented reality display, a virtually reality display, or any other display able to present and/or project digital content. In some examples, the display 1116 can have a touch sensor associated with the display 1116 to provide a touchscreen display configured to receive touch inputs for enabling interaction with a graphic interface presented on the display 1116. Accordingly, implementations herein are not limited to any particular display technology. Alternatively, in some examples, the user device 1102 may not include the display 1116, and information can be presented by other means, such as aurally, haptically, etc.

In addition, the user device 1102 can include sensor(s) 1118. The sensor(s) 1118 can include a GPS device able to indicate location information. Further, the sensor(s) 1118 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 714 and/or for sending users 714 notifications regarding available appointments with merchant(s) located proximate to the users 714. In at least one example, location can be used for taking payments from nearby customers when they leave a geofence, or location can be used to initiate an action responsive to users 714 enter a brick-and-mortar store of a merchant. Location can be used in additional or alternative ways as well.

Additionally, the user device 1102 can include various other components that are not shown, examples of which include removable storage, a power source, such as a battery and power control unit, a barcode scanner, a printer, a cash drawer, and so forth.

In addition, in some examples, the user device 1102 can include, be connectable to, or otherwise be coupled to a reader device 1126, for reading payment instruments and/or identifiers associated with payment objects. In some examples, as described above, the reader device 1126 can plug in to a port in the user device 1102, such as a microphone port, a headphone port, an audio-jack, a data port, or other suitable port. In additional or alternative examples, the reader device 1126 can be coupled to the user device 1102 via another wired or wireless connection, such as via a Bluetooth®, BLE, and so on. The reader device 1126 can include a read head for reading a magnetic strip of a payment card, and further can include encryption technology for encrypting the information read from the magnetic strip. Additionally or alternatively, the reader device 1126 can be an EMV payment reader, which in some examples, can be embedded in the user device 1102. Moreover, numerous other types of readers can be employed with the user device 1102 herein, depending on the type and configuration of the user device 1102.

The reader device 1126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1126 may include hardware implementation, such as slots, magnetic tracks, and rails with one or more sensors or electrical contacts to facilitate detection and acceptance of a payment instrument. That is, the reader device 1126 may include hardware implementations to enable the reader device 1126 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1126 may also include a biometric sensor to receive and process biometric characteristics and process them as payment instruments, given that such biometric characteristics are registered with the payment service system 100 and connected to a financial account with a bank server.

The reader device 1126 may include processing unit(s), computer-readable media, a reader chip, a transaction chip, a timer, a clock, a network interface, a power supply, and so on. The processing unit(s) of the reader device 1126 may execute one or more components and/or processes to cause the reader device 1126 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1126, the computer-readable media may include volatile memory (such as RAM), non-volatile memory (such as ROM, flash memory, miniature hard drive, memory card, or the like), or some combination thereof. In at least one example, the computer-readable media of the reader device 1126 may include at least one component for performing various functions as described herein.

The reader chip may perform functionalities to control the operations and processing of the reader device 1126. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1112, which may provide a clock signal indicating a time. Furthermore, the reader chip may perform functionality to control the network interface, which may interface with the network(s) 1106, as described below:

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1126. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1102, which can be a POS terminal, and the reader device 1126 are shown as separate devices, in additional or alternative examples, the user device 1102 and the reader device 1126 can be part of a single device, which may be a battery-operated device. In such an example, components of both the user device 1102 and the reader device 1126 may be associated with the single device. In some examples, the reader device 1126 can have a display integrated therewith, which can be in addition to (or as an alternative of) the display 1116 associated with the user device 1102.

The server(s) 1104 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1104 can include one or more processors 1128, one or more computer-readable media 1130, one or more I/O devices 1132, and one or more communication interfaces 1134. Each processor 1128 can be a single processing unit or a number of processing units, and can include single or multiple computing units or multiple processing cores. The processor(s) 1128 can be implemented as one or more microprocessors, microcomputers, microcontrollers, digital signal processors, central processing units, state machines, logic circuitries, and/or any devices that manipulate signals based on operational instructions. For example, the processor(s) 1128 can be one or more hardware processors and/or logic circuits of any suitable type specifically programmed or configured to execute the algorithms and processes described herein. The processor(s) 1128 can be configured to fetch and execute computer-readable instructions stored in the computer-readable media 1130, which can program the processor(s) 1128 to perform the functions described herein.

The computer-readable media 1130 can include volatile and nonvolatile memory and/or removable and non-removable media implemented in any type of technology for storage of information, such as computer-readable instructions, data structures, program components, or other data. Such computer-readable media 1130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1104, the computer-readable media 1130 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1130 can be used to store any number of functional components that are executable by the processor(s) 1128. In many implementations, these functional components comprise instructions or programs that are executable by the processors 1128 and that, when executed, specifically configure the one or more processors 1128 to perform the actions attributed above to the service provider and/or payment processing service. Functional components stored in the computer-readable media 1130 can optionally include a service 108, such as a payment service. (including the sub-components 138 and/or 140, and/or the trained machine learning model 136 depicted in FIG. 1), a training component 1138, and one or more other components and data 1140.

The training component 1138 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1102 and/or the server(s) 1104 for use at a time after the data models have been trained (e.g., at runtime).

The one or more other components and data 1140 can include the sub-components of the payment service 108, the functionality of which is described, at least partially, above. Further, the one or more other components and data 1140 can include a merchant component configured to receive transaction data from POS systems, such as the POS system 724 described above with reference to FIG. 7. Such a merchant component can transmit requests (e.g., authorization, capture, settlement, etc.) to payment service server computing device(s) to facilitate POS transactions between merchants and customers. Such a merchant component can communicate the successes or failures of the POS transactions to the POS systems. Further, the one or more other components and data 1140 can include programs, drivers, etc., and the data used or generated by the functional components. Further, the server(s) 1104 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1130 can additionally include an operating system 1142 for controlling and managing various functions of the server(s) 1104.

The communication interface(s) 1134 can include one or more interfaces and hardware components for enabling communication with various other devices, such as over the network(s) 1106 or directly. For example, communication interface(s) 1134 can enable communication through one or more network(s) 1106, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1102 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1104 can further be equipped with various I/O devices 1132. Such I/O devices 1132 can include a display, various user interface controls (e.g., buttons, joystick, keyboard, mouse, touch screen, biometric or sensory input devices, etc.), audio speakers, connection ports and so forth.

In at least one example, the system 1100 can include a datastore 1144 that can be configured to store data that is accessible, manageable, and updatable. The data store 1144 may be the same as or similar to the data store(s) 114 introduced in FIG. 1. In some examples, the datastore 1144 can be integrated with the user device 1102 and/or the server(s) 1104. In other examples, as shown in FIG. 11, the datastore 1144 can be located remotely from the server(s) 1104 and can be accessible to the server(s) 1104. The datastore 1144 can comprise multiple databases and/or servers connected locally and/or remotely via the network(s) 1106.

In at least one example, the datastore 1144 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) can include or be associated with the merchant profiles and/or customer profiles described above.

Furthermore, in at least one example, the datastore 1144 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1144 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flow charts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A system comprising:

one or more processors; and memory coupled to the one or more processors, with computer-executable instructions stored thereon that, when executed by the one or more processors, cause the one or more processors to perform operations comprising:

determining an accuracy metric associated with a first trained machine learning model that is trained to generate representations of input faces wherein individual representations have N dimensions in a latent space;

based at least in part on the accuracy metric, retraining the first trained machine learning model to obtain a second trained machine learning model that is trained to generate different dimensional representations of input faces than the first trained machine learning model wherein the different dimensional representations have fewer or more dimensions than N, wherein in response to the accuracy metric satisfying a first threshold that indicates the first trained machine learning model generates the representations of the input faces above a first accuracy, the second trained machine learning model is trained to generate P-dimensional representations of input faces, P being less than N; and wherein in response to the accuracy metric satisfying a second threshold that indicates the first trained machine learning model generates the representations of the input faces below a second accuracy, the second trained machine learning model is trained to generate Q-dimensional representations of input faces, N being less than Q;

receiving, in association with a request to access a service and after the retraining, image data representing a face of a user and additional data;

determining, based at least in part on the image data and using the second trained machine learning model, a representation of the face of the user, wherein the representation comprises an embedding that represents the face of the user;

determining one or more representations of faces associated with the representation based on performing a search of a plurality of stored representations of faces with the representation of the face of the user as a search query for the search, wherein the one or more representations of faces comprise one or more embeddings that each represent a respective face of the faces, the one or more representations of faces being associated with one or more user accounts and previously obtained by the service;

determining first information associated with the user and based at least in part on the additional data;

determining second information associated with the one or more representations, the second information being associated with the one or more user accounts and previously obtained by the service;

determining one or more differences between the first information and the second information; and determining whether to accept or deny the request based at least in part on of the one or more differences.

2. The system of claim 1, the operations further comprising:

classifying the request as a fraudulent request based at least in part on the one or more differences, wherein the determining whether to accept or deny the request is based at least in part on the classifying of the request as the fraudulent request.

3. The system of claim 1, wherein:

the image data and the additional data are received from an application executing on an electronic device, the application associated with the service; and the additional data comprises device data associated with the electronic device.

4. The system of claim 1, wherein:

the second information includes one or more tokens stored in association with the one or more user accounts, wherein the one or more tokens indicate a number of previous requests by the one or more user accounts or by a device associated with the one or more user accounts to access the service, wherein determining whether to accept or deny the request is based at least in part on the one or more differences and is based at least in part on the one or more tokens.

5. The system of claim 1, wherein performing the search of the plurality of stored representations of faces includes performing, based at least in part on the representation, an approximate nearest neighbor search of the plurality of stored representations of faces stored in a data store, and wherein the determining of the one or more representations is based at least in part on the approximate nearest neighbor search.

6. The system of claim 5, wherein the representation is a first representation and the face of the user is a first face, the operations further comprising:

determining, based at least in part on the approximate nearest neighbor search, a superset of face representations of the plurality of stored representations of faces, the superset including at least a second representation of a second face and a third representation of a third face;

calculating a first distance between the first representation and the second representation;

calculating a second distance between the first representation and the third representation;

determining that the first distance fails to satisfy a threshold distance; and determining that the second distance satisfies the threshold distance;

wherein the one or more representations:

include the second representation based at least in part on the first distance failing to satisfy the threshold distance; and exclude the third representation based at least in part on the second distance satisfying the threshold distance.

7. A computer-implemented method comprising:

determining, by a server computing device, an accuracy metric associated with a first trained machine learning model that is trained to generate representations of input faces wherein individual representations have N dimensions in a latent space;

based at least in part on the accuracy metric, retraining, by the server computing device, the first trained machine learning model to obtain a second trained machine learning model that is trained to generate different dimensional representations of input faces than the first trained machine learning model wherein the different dimensional representations have fewer or more dimensions than N, wherein in response to the accuracy metric satisfying a first threshold that indicates the first trained machine learning model generates the representations of the input faces above a first accuracy, the second trained machine learning model is trained to generate P-dimensional representations of input faces, P being less than N; and wherein in response to the accuracy metric satisfying a second threshold that indicates the first trained machine learning model generates the representations of the input faces below a second accuracy, the second trained machine learning model is trained to generate Q-dimensional representations of input faces, N being less than Q;

receiving, by the server computing device, in association with a request to access a service and after the retraining, image data representing a face of a user and additional data associated with the user;

determining, by the server computing device, and based at least in part on the image data and using the second trained machine learning model, a representation of the face of the user, wherein the representation comprises an embedding that represents the face of the user;

determining, by the server computing device, one or more representations of faces associated with the representation, based on performing a search of a plurality of stored representations of faces based on distances between points in a latent space of the representation and corresponding points in a respective latent space of the each of the stored representations of faces, wherein the one or more representations of faces comprise one or more embeddings that each represent a respective face of the faces, the one or more representations of faces being associated with one or more user accounts and previously obtained by the service;

determining, by the server computing device, first information associated with the user and based at least in part on the additional data;

determining, by the server computing device, second information associated with the one or more representations, the second information being associated with the one or more user accounts and previously obtained by the service;

determining, by the server computing device, one or more differences between the first information and the second information; and determining, by the server computing device, whether to accept or deny the request based at least in part on the one or more differences.

8. The computer-implemented method of claim 7, wherein:

the first information comprises at least one of a first name or a first date of birth (DOB); and the second information comprises at least one of a second name or a second DOB.

9. The computer-implemented method of claim 7, wherein the request to access the service is associated with an identity verification (IDV) attempt.

10. The computer-implemented method of claim 7, wherein the image data corresponds to an image of the face of the user captured via a camera of an electronic device while the electronic device is executing an application associated with the service.

11. The computer-implemented method of claim 7, wherein:

the embedding comprises a numerical representation of the face of the user; and the one or more embeddings comprise one or more numerical representations of a respective face of the faces.

12. The computer-implemented method of claim 7, wherein performing the search of the plurality of stored representations of faces includes performing, by the server computing device, and based at least in part on the representation, an approximate nearest neighbor search of the plurality of stored representations of faces stored in a data store, and wherein the determining of the one or more representations is based at least in part on the approximate nearest neighbor search.

13. The computer-implemented method of claim 7, wherein the representation is a first representation and the face of the user is a first face, the computer-implemented method further comprising:

determining, by the server computing device, and based at least in part on an approximate nearest neighbor search, a superset of face representations of the one or more representations of faces, the superset including at least a second representation of a second face and a third representation of a third face;

calculating, by the server computing device, a first distance between the first representation and the second representation;

calculating, by the server computing device, a second distance between the first representation and the third representation;

determining, by the server computing device, that the first distance fails to satisfy a threshold distance; and determining, by the server computing device, that the second distance satisfies the threshold distance;

wherein the one or more representations:

include the second representation based at least in part on the first distance failing to satisfy the threshold distance; and exclude the third representation based at least in part on the second distance satisfying the threshold distance.

14. The system of claim 1, wherein the search the search of the plurality of stored representations of faces is based on distances between points in a latent space of the representation and corresponding points in a respective latent space of each of the plurality of stored representations of faces, and the operations further comprise:

selecting the one or more representations of faces from the plurality of stored representations of faces based on a threshold distance and based on the search.

15. The system of claim 1, wherein the operations further comprise:

comparing the one or more differences to a threshold, wherein determining whether to accept or deny the request is based at least in part on the determining of the one or more differences and the comparing the one or more differences to the threshold.

* * * * *